US012155273B2

(12) United States Patent
Nakatsuka et al.

(10) Patent No.: US 12,155,273 B2
(45) Date of Patent: Nov. 26, 2024

(54) SCREWING MACHINE AND TORQUE SENSOR

(71) Applicants: MAKITA CORPORATION, Anjo (JP); MINEBEA MITSUMI INC., Nagano (JP)

(72) Inventors: Takaharu Nakatsuka, Anjo (JP); Yuta Izutsu, Anjo (JP); Kotaro Eguchi, Fujisawa (JP); Kui Li, Yamato (JP)

(73) Assignees: MAKITA CORPORATION, Anjo (JP); MINEBEA MITSUMI INC., Kitasaku-gun (JP)

( * ) Notice: Subject to any disclaimer, the term of this patent is extended or adjusted under 35 U.S.C. 154(b) by 534 days.

(21) Appl. No.: 17/362,473

(22) Filed: Jun. 29, 2021

(65) Prior Publication Data

US 2022/0045579 A1     Feb. 10, 2022

(30) Foreign Application Priority Data

Aug. 6, 2020    (JP) ................................. 2020-134020

(51) Int. Cl.
    *B25B 21/00*         (2006.01)
    *B25B 23/147*      (2006.01)
                (Continued)

(52) U.S. Cl.
    CPC .............. *H02K 11/02* (2013.01); *B25B 21/00* (2013.01); *B25B 23/147* (2013.01); *H02K 7/10* (2013.01);
                (Continued)

(58) Field of Classification Search
    CPC .......... H02K 7/10; H02K 7/145; H02K 11/02; H02K 11/24; H02K 11/30; B25B 21/00;
                (Continued)

(56) References Cited

U.S. PATENT DOCUMENTS

| 8,844,381 | B2* | 9/2014 | Gharib ................ B25B 23/1425 81/479 |
| 2002/0050174 | A1* | 5/2002 | Valdevit ................... G01B 7/18 73/795 |
| 2010/0206141 | A1* | 8/2010 | Nakata ................ B25B 23/1425 81/479 |

FOREIGN PATENT DOCUMENTS

| JP | 6-61465 U | 8/1994 |
| JP | H09-29654 A | 2/1997 |

(Continued)

OTHER PUBLICATIONS

Jan. 9, 2024 Office Action issued in Japanese Patent Application No. 2020-134020.

(Continued)

*Primary Examiner* — Robert J Scruggs
(74) *Attorney, Agent, or Firm* — Oliff PLC

(57) ABSTRACT

A screwing machine includes a motor, an output shaft, a twist portion, a plate portion, a strain gauge, an amplification circuit. The output shaft is driven by the motor. To the output shaft, a bit is attachable. The twist portion is hollow. To the twist portion, torque applied to the output shaft is transmitted through a transmission element. The output shaft is configured to be indirectly twisted by the torque applied to the output shaft. The plate portion is integrally formed with the twist portion. The strain gauge is disposed on the twist portion. The amplification circuit is disposed on the plate portion. To the amplification circuit, a signal from the strain gauge is input.

14 Claims, 15 Drawing Sheets

(51) Int. Cl.
  *H02K 7/10* (2006.01)
  *H02K 7/14* (2006.01)
  *H02K 11/02* (2016.01)
  *H02K 11/24* (2016.01)
  *H02K 11/30* (2016.01)

(52) U.S. Cl.
  CPC ............. *H02K 7/145* (2013.01); *H02K 11/24* (2016.01); *H02K 11/30* (2016.01)

(58) Field of Classification Search
  CPC ......... B25B 23/14; B25B 23/147; B25F 5/00; B25F 5/001; H02P 29/00; H02P 3/00; G01L 3/00
  See application file for complete search history.

(56) References Cited

FOREIGN PATENT DOCUMENTS

| | | | | |
|---|---|---|---|---|
| JP | H0929654 | * | 2/1997 | |
| JP | 2017173183 | * | 9/2017 | |
| JP | 2018-62268 A | | 4/2018 | |
| JP | 2018071557 | * | 7/2018 | |
| JP | 2018-122429 A | | 8/2018 | |
| KR | 20110123597 | * | 11/2011 | |
| WO | WO 2019201589 | * | 10/2019 | |
| WO | WO-2019201589 A1 | * | 10/2019 | ............. B25B 21/00 |
| WO | WO-2020054616 A1 | * | 3/2020 | ........... B24B 23/028 |

OTHER PUBLICATIONS

Jul. 2, 2024 Office Action issued in Japanese Patent Application No. 2020-134020.

\* cited by examiner

SCREWING MACHINE AND TORQUE SENSOR

CROSS-REFERENCE TO RELATED APPLICATION(S)

The present application claims priority to and incorporates by reference the entire contents of Japanese Patent Application No. 2020-134020 filed in Japan on Aug. 6, 2020.

BACKGROUND OF THE INVENTION

1. Field of the Invention

The present disclosure relates to a screwing machine and a torque sensor.

2. Description of the Related Art

In a technical field of screwing machines, a tool as disclosed in JP 2018-122429 A has been known. In JP 2018-122429 A, the tool includes a torque sensor.

In an assembly process of a product, screwing work using a screwing machine is performed. For management of the product, a detection signal of torque applied to an output shaft is recorded in some cases. The screwing machine is sometimes provided with an amplification circuit configured to amplify the torque detection signal. To appropriately record the torque detection signal, it is needed to reduce influence of noise on the torque detection signal input to the amplification circuit.

An object of the present disclosure is to disclose techniques for reducing influence of noise on the torque detection signal input to the amplification circuit.

SUMMARY OF THE INVENTION

In one aspect of the present disclosure, a screwing machine includes a motor, an output shaft, a twist portion, a plate portion, a strain gauge, an amplification circuit. The output shaft is driven by the motor. To the output shaft, a bit is attachable. The twist portion is hollow. To the twist portion, torque applied to the output shaft is transmitted through a transmission element. The output shaft is configured to be indirectly twisted by the torque applied to the output shaft. The plate portion is integrally formed with the twist portion. The strain gauge is disposed on the twist portion. The amplification circuit is disposed on the plate portion. To the amplification circuit, a signal from the strain gauge is input.

DETAILED DESCRIPTION OF THE PREFERRED EMBODIMENTS

Embodiments of the present disclosure will be described below with reference to the accompanying drawings. However, the present disclosure is not limited to the embodiments. Components of the embodiments described below can be combined as appropriate. Some components may be omitted.

In the embodiments, the positional relation among parts will be described using terms "left", "right", "front", "back", "up", and "down". These terms indicate relative positions and directions with respect to the center of a screwing machine.

A motor is a power source of the screwing machine. A direction parallel to a rotational axis AX of the motor is referred to as an axial direction as appropriate. The direction that goes around the rotational axis AX is referred to as a circumferential direction or rotational direction as appropriate. The radiating (radially-extending) direction of the rotational axis AX is referred to as a radial direction as appropriate.

The rotational axis AX extends in the front-back direction. The axial direction and the front-back direction coincide. One side in the axial direction is forward, and the other side in the axial direction is backward. In the radial direction, a location that is close to or a direction that approaches the rotational axis AX is referred to as inward in the radial direction as appropriate, and a location that is far from or a direction that goes away from the rotational axis AX is referred to as outward in the radial direction as appropriate.

First Embodiment

A first embodiment will be described below.
Screwing Machine

Figure 1:
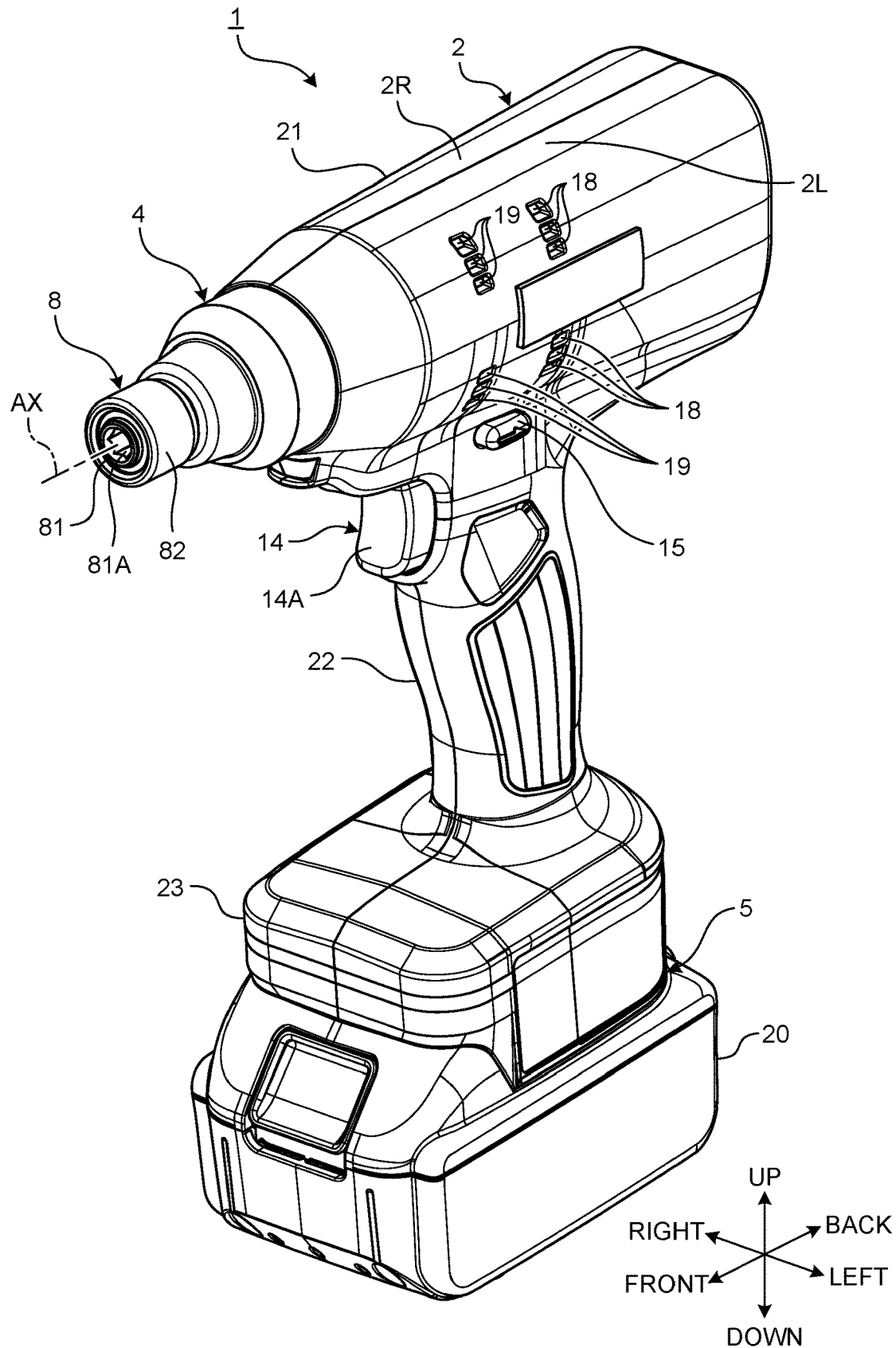
FIG. 1 is a front-side perspective view illustrating a screwing machine according to a first embodiment.
Figure 2:
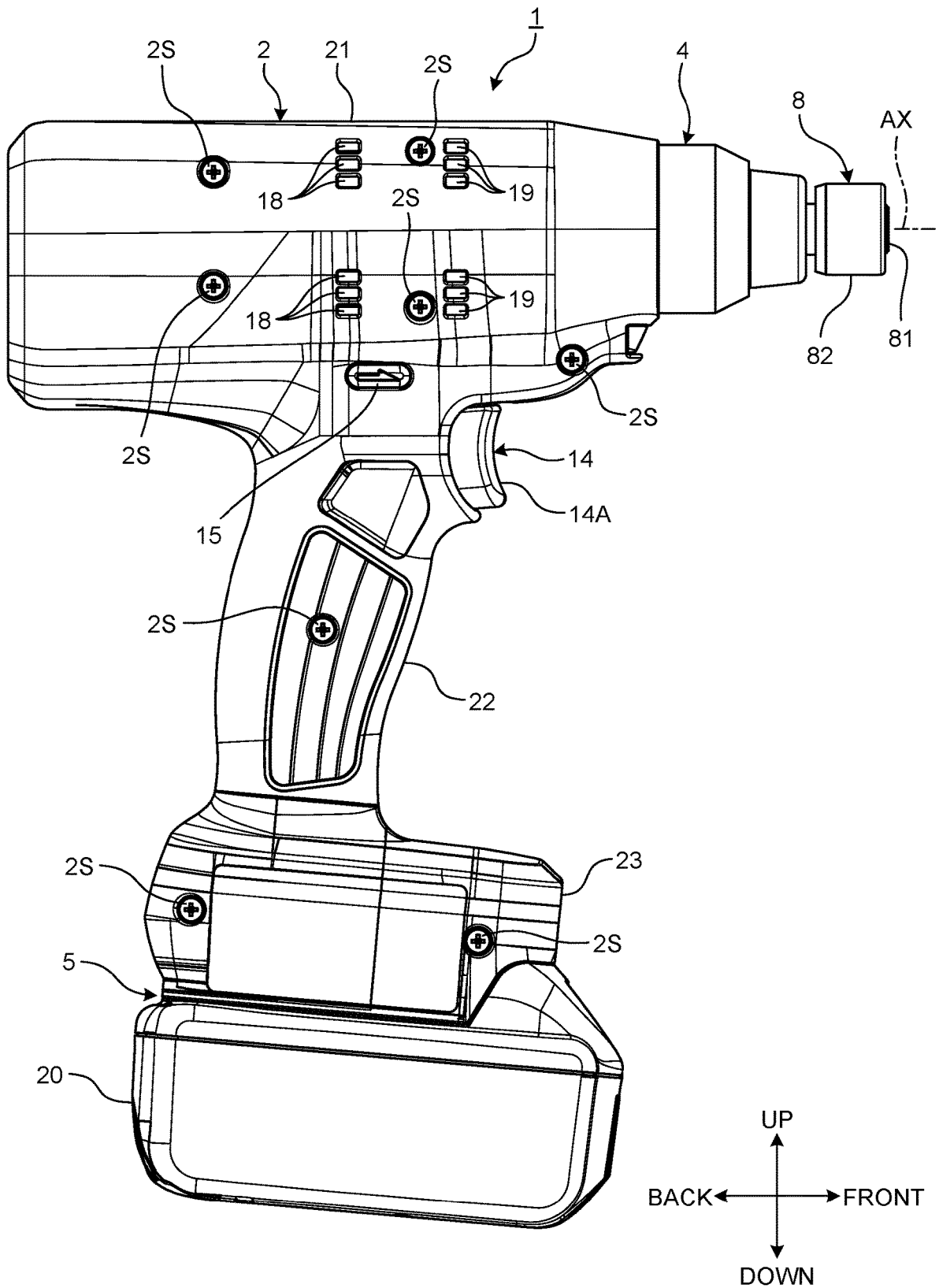
FIG. 2 is a side view illustrating the screwing machine according to the first embodiment.
Figure 3:
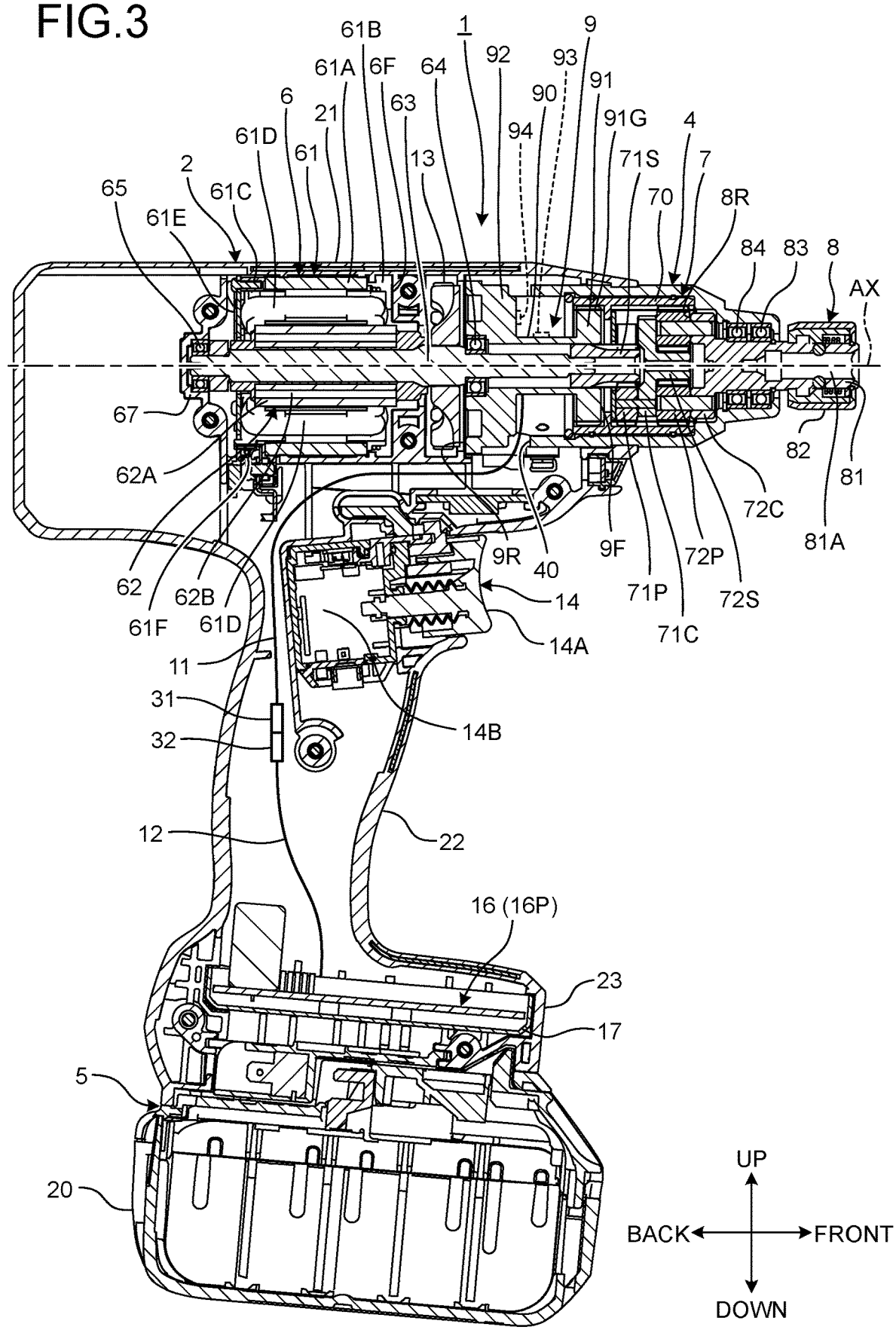
FIG. 3 is a cross-sectional view illustrating the screwing machine according to the first embodiment.

FIG. 1 is a front-side perspective view illustrating a screwing machine 1 according to the present embodiment. FIG. 2 is a side view illustrating the screwing machine 1 according to the present embodiment. FIG. 3 is a cross-sectional view illustrating the screwing machine 1 according to the present embodiment. The screwing machine 1 is an industrial electric driver used at an assembly factory. In an assembly process of a product, screwing work using the screwing machine 1 is performed. The assembly factory is, for example, an automobile assembly factory. The product is, for example, an automobile.

As illustrated in FIGS. 1, 2, and 3, the screwing machine 1 includes a housing 2, a gear case 4, a battery mounting portion 5, a motor 6, a planetary gear mechanism 7, an output shaft 8, a torque sensor 9, a first lead line 11, a second lead line 12, a fan 13, a trigger switch 14, a forward-reverse change lever 15, a control circuit board 16, and a control circuit board case 17.

The housing 2 is made of synthesis resin. The housing 2 includes a left housing 2L and a right housing 2R. The left housing 2L and the right housing 2R are fixed to each other by screws 2S. The housing 2 is formed by fixing the left housing 2L and the right housing 2R.

The housing 2 includes a motor housing portion 21, a grip portion 22, and a control circuit board housing portion 23.

The motor housing portion 21 houses the motor 6. The motor housing portion 21 includes a tubular part. The motor housing portion 21 is disposed above the grip portion 22.

The grip portion 22 is configured to be gripped by a worker. The grip portion 22 is disposed downward of the motor housing portion 21. The grip portion 22 protrudes downward from the motor housing portion 21. The trigger switch 14 is disposed on the grip portion 22.

The control circuit board housing portion 23 houses the control circuit board 16. The control circuit board housing portion 23 is disposed downward of the grip portion 22. The control circuit board housing portion 23 is connected to a lower end part of the grip portion 22. The dimensions of the outer shape of the control circuit board housing portion 23 in both the front-back direction and the left-right are larger than the dimensions of the outer shape of the grip portion 22.

The gear case 4 houses the torque sensor 9, the planetary gear mechanism 7, and part of the output shaft 8. The gear case 4 is disposed forward of the motor 6. The gear case 4 has a tubular shape. The gear case 4 is made of metal. In the present embodiment, the gear case 4 is made of aluminum. The gear case 4 is disposed to cover an opening at a front part of the motor housing portion 21. The gear case 4 is fixed to the motor housing portion 21. A back part of the gear case 4 is disposed inside the motor housing portion 21. At least part of the motor housing portion 21 is disposed around the gear case 4. A front part of the gear case 4 is disposed forward of the motor housing portion 21.

The battery mounting portion 5 is formed at a lower portion of the control circuit board housing portion 23. The battery mounting portion 5 is connected to a battery pack 20. The battery pack 20 is mountable on the battery mounting portion 5. The battery pack 20 is detachably attached to the battery mounting portion 5. The battery pack 20 includes a secondary battery. In the present embodiment, the battery pack 20 includes a rechargeable lithium ion battery. When mounted on the battery mounting portion 5, the battery pack 20 can supply electrical power to the screwing machine 1. The motor 6 is driven based on electrical power supplied from the battery pack 20. The control circuit board 16 operates based on electrical power supplied from the battery pack 20.

The motor 6 is a power source for the screwing machine 1. The motor 6 is an electric motor. The motor 6 is an inner-rotor-type brushless motor. The motor 6 is housed in the motor housing portion 21. The motor 6 includes a stator 61 and a rotor 62. The stator 61 is disposed around the rotor 62. The rotor 62 rotates about the rotational axis AX.

The stator 61 includes a stator core 61A, a front insulator 61B, a back insulator 61C, a coil 61D, a sensor circuit board 61E, and a short-circuit member 61F.

The stator core 61A has a tubular shape. The stator core 61A includes a plurality of stacked steel plates. The front insulator 61B is disposed on a front portion of the stator core 61A. The back insulator 61C is disposed on a back portion of the stator core 61A. A plurality of the coils 61D are provided. The coils 61D are wound on the stator core 61A through the front insulator 61B and the back insulator 61C. The sensor circuit board 61E includes a plurality of rotation detection elements configured to detect the rotation of the rotor 62. The sensor circuit board 61E is supported by the back insulator 61C. The short-circuit member 61F connects the coils 61D through fusing terminals. The short-circuit member 61F is supported by the back insulator 61C. The short-circuit member 61F is connected to the control circuit board 16 through a lead line (not illustrated).

The rotor 62 includes a rotor core 62A, a permanent magnet 62B, and a rotor shaft 63.

The rotor core 62A is disposed inside the stator core 61A and the coil 61D. The rotor core 62A has a cylindrical shape. The rotor core 62A is disposed around the rotor shaft 63. The rotor core 62A includes a plurality of stacked steel plates. A plurality of the permanent magnets 62B are provided. The permanent magnets 62B are held by the rotor core 62A. The rotor core 62A has a through-hole extending in the axial direction. A plurality of the through-holes are formed in the circumferential direction. The permanent magnets 62B are respectively disposed in the plurality of (in the present embodiment, four) through-holes of the rotor core 62A.

The rotation detection elements of the sensor circuit board 61E detect the rotation of the rotor 62 by detecting the magnetic fields of the plurality of (in the present embodiment, four) permanent magnets 62B. The control circuit board 16 supplies drive currents to the coils 61D based on detection signals from the rotation detection elements.

The rotor shaft 63 extends in the axial direction. The rotor shaft 63 rotates about the rotational axis AX. The rotational axis AX of the rotor shaft 63 coincides with the rotational axis of the output shaft 8. A front part of the rotor shaft 63 is rotatably supported by a bearing 64. A back part of the rotor shaft 63 is rotatably supported by a bearing 65. The bearing 64 is held by the torque sensor 9. The bearing 65 is held by a bearing holding portion 67 provided to the motor housing portion 21. A front end part of the rotor shaft 63 is disposed forward of the bearing 64. The front end part of the rotor shaft 63 is disposed inside the gear case 4.

A pinion gear 71S is provided at the front end part of the rotor shaft 63. The rotor shaft 63 is coupled to the planetary gear mechanism 7 via the pinion gear 71S.

The planetary gear mechanism 7 is housed in the gear case 4. The planetary gear mechanism 7 couples the rotor shaft 63 and the output shaft 8. The planetary gear mechanism 7 decelerates the rotation of the rotor shaft 63 and rotates the output shaft 8 at a rotational speed lower than that of the rotor shaft 63. The planetary gear mechanism 7 functions as a power transmission mechanism configured to transmit the rotational force generated by the motor 6 to the output shaft 8. The planetary gear mechanism 7 includes a plurality of (in the present embodiment, three) gears. The planetary gear mechanism 7 is disposed forward of the torque sensor 9.

Figure 4:
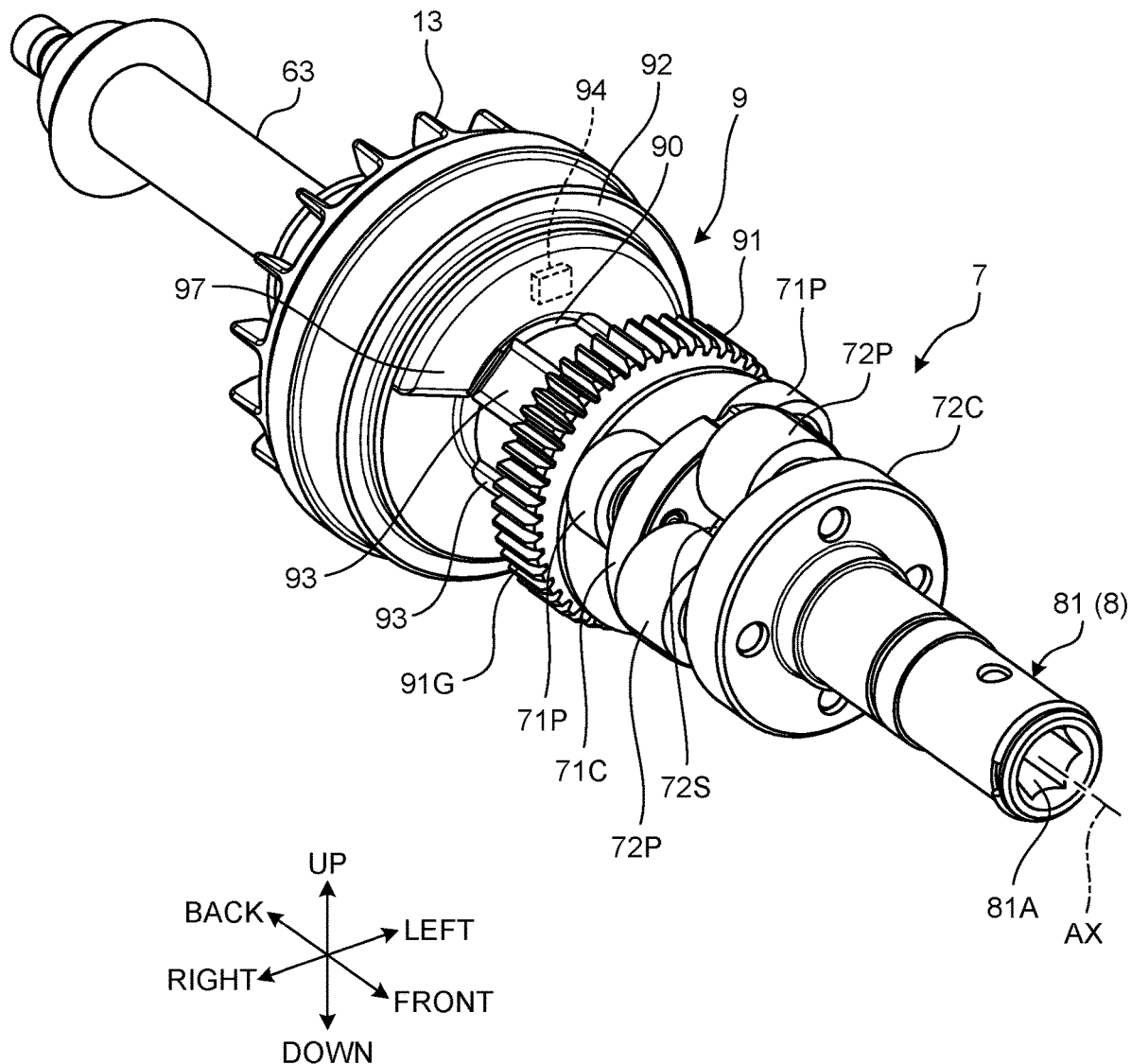
FIG. 4 is an extracted perspective view of the vicinity of a planetary gear mechanism according to the first embodiment.

FIG. 4 is an extracted perspective view of the vicinity of the planetary gear mechanism 7 according to the present embodiment. As illustrated in FIGS. 3 and 4, the planetary gear mechanism 7 includes a planetary gear 71P, a carrier 71C, a sun gear 72S, a planetary gear 72P, a carrier 72C, and an internal gear 70.

A plurality of the planetary gears 71P are provided. The plurality of (in the present embodiment, three) planetary gears 71P are disposed around the pinion gear 71S. The planetary gears 71P mesh with the pinion gear 71S. The carrier 71C supports the planetary gears 71P so that they are rotatable relative to the carrier 71C. The sun gear 72S is disposed forward of the carrier 71C. The diameter of the sun gear 72S is smaller than the diameter of the carrier 71C. The carrier 71C and the sun gear 72S are integrated with each other. The carrier 71C and the sun gear 72S rotate together. A plurality of the planetary gears 72P are provided. The planetary gears 72P are disposed around the sun gear 72S. The planetary gears 72P mesh with the sun gear 72S. The carrier 72C supports the planetary gears 72P so that they are rotatable relative to the carrier 72C. The internal gear 70 is disposed around the planetary gears 72P. The internal gear 70 is disposed inward of the gear case 4. The internal gear 70 does not rotate. The internal gear 70 is coupled to the torque sensor 9.

The rotor shaft 63 is coupled to the sun gear 72S through the pinion gear 71S, the planetary gears 71P, and the carrier 71C. The sun gear 72S is rotated by rotational force generated by the motor 6. The internal gear 70 is disposed around the sun gear 72S. The planetary gears 72P are disposed between the sun gear 72S and the internal gear 70 in the radial direction. The planetary gears 72P mesh with the sun gear 72S. The planetary gears 72P mesh with the internal gear 70. The carrier 72C supports the planetary gears 72P so that they are rotatable relative to the carrier 72C. The carrier 72C is connected to the output shaft 8. The carrier 72C rotates about the rotational axis AX.

When the rotor shaft 63 is rotated by the motor 6, the pinion gear 71S rotates, and the planetary gears 71P revolve around the pinion gear 71S. Owing to the revolving of the planetary gears 71P, the carrier 71C and the sun gear 72S rotate at a rotational speed that is lower than that of the rotor shaft 63. When the sun gear 72S rotates, the planetary gears 72P revolve around the sun gear 72S. Owing to the revolving of the planetary gears 72P, the carrier 72C rotates at a rotational speed that is lower than that of the carrier 71C. In this manner, when the motor 6 is driven, the carrier 72C rotates at a rotational speed that is lower than that of the rotor shaft 63.

The output shaft 8 is driven by the motor 6. To the output shaft 8, a bit (leading end tool) can be attached. The output shaft 8 rotates by rotational force generated by the motor 6 with the bit being attached thereto. The output shaft 8 rotates based on rotational force transmitted from the motor 6 via the planetary gear mechanism 7. At least part of the output shaft 8 is disposed forward of the planetary gear mechanism 7.

The output shaft 8 includes a spindle 81 and a chuck 82.

The spindle 81 rotates about the rotational axis AX based on rotational force transmitted from the motor 6. The spindle 81 is rotatably supported by a bearing 83 and a bearing 84. The spindle 81 is connected to the carrier 72C. When the carrier 72C rotates, the spindle 81 rotates about the rotational axis AX. The spindle 81 has an insertion hole 81A into which a bit having a substantially hexagonal section is inserted. The insertion hole 81A has a substantially hexagonal section, as well. With the substantially hexagonal shapes of the bit and the insertion hole, the bit is fixed to the spindle in the rotational direction. The insertion hole 81A is formed so as to extend backward from a front end part of the spindle 81. In the chuck 82, a concave part of the bit inserted into the insertion hole 81A prevents, through a ball, the bit from being removed to the front side. The chuck 82 is disposed around a front part of the spindle 81. When the spindle 81 rotates, the bit being fixed in the rotational direction and prevented from being removed to the front side rotates.

The torque sensor 9 detects torque applied to the output shaft 8. The torque applied to the output shaft 8 is shaft torque applied about the rotational axis AX. Screwing work is performed in a state in which a bit is attached to the output shaft 8. Torque detected by the torque sensor 9 includes screwing torque applied to the output shaft 8 in screwing work. A detection signal output from the torque sensor 9 represents a detection signal of the torque applied to the output shaft 8.

The torque sensor 9 includes a twist portion 90, a plate portion 91, a plate portion 92, a strain gauge 93, an amplification circuit 94, and a cover 97.

The torque sensor 9 is coupled to the output shaft 8. In the present embodiment, the plate portion 91 of the torque sensor 9 is coupled to the internal gear 70 of the planetary gear mechanism 7. The torque sensor 9 is coupled to the output shaft 8 via the planetary gear mechanism 7.

The torque sensor 9 is housed in the gear case 4. The torque sensor 9 is disposed forward of the stator 61. The torque sensor 9 is disposed backward of the output shaft 8. In other words, the torque sensor 9 is disposed between a front end part 6F of the stator 61 and a back end part 8R of the output shaft 8 in the front-back direction. In the present embodiment, the torque sensor 9 is disposed between the fan 13 and the planetary gear mechanism 7.

The torque sensor 9 is disposed around the rotor shaft 63. The front end part of the rotor shaft 63 is disposed forward of a front end part 9F of the torque sensor 9. The pinion gear 71S is provided at the front end part of the rotor shaft 63. The pinion gear 71S is disposed forward of the front end part 9F of the torque sensor 9. The fan 13 and the motor 6 are disposed backward of a back end part 9R of the torque sensor 9.

A plurality of the first lead lines 11 are provided. The first lead lines 11 are connected to the amplification circuit 94. The first lead lines 11 are connected to a first connector 31.

A hole 40 is formed at the gear case 4. The hole 40 is formed so as to connect the inside and outside of the gear case 4. The first lead lines 11 extend outward through the hole 40. One end part of each first lead line 11 is disposed inside the gear case 4 and connected to the amplification circuit 94. The other end part of the first lead line 11 is disposed outside the gear case 4 and connected to the first connector 31.

A plurality of the second lead lines 12 are provided. The second lead lines 12 are connected to the control circuit board 16. The second lead lines 12 are connected to a second connector 32.

The first connector 31 is connected to the second connector 32.

The fan 13 is disposed forward of the stator 61. The fan 13 generates airflow for cooling the motor 6. The fan 13 is fixed to the rotor shaft 63. The fan 13 rotates with rotation of the rotor shaft 63. The motor housing portion 21 includes an inlet 18 and an outlet 19. The inlet 18 is provided backward of the outlet 19. When the fan 13 rotates, air outside the housing 2 flows into the housing 2 through the inlet 18. The air having flowed into the housing 2 circulates inside the housing 2, thereby cooling the motor 6. The air having circulated inside the housing 2 flows out of the housing 2 through the outlet 19.

The trigger switch 14 is configured to be manually manipulated to start the motor 6. The trigger switch 14 is disposed on the grip portion 22. The trigger switch 14 includes a trigger member 14A and a switch body 14B. The switch body 14B is housed in the grip portion 22. The trigger member 14A protrudes forward from an upper part of a front part of the grip portion 22. The trigger member 14A is manipulated by the worker. Drive and stop of the motor 6 are switched upon the manipulation of the trigger member 14A.

The forward-reverse change lever 15 is provided on the upper portion of the grip portion 22. The forward-reverse change lever 15 is manually manipulated by the worker. When the forward-reverse change lever 15 is manipulated, the rotational direction of the motor 6 is switched from one of a forward rotational direction and a reverse rotational direction to the other of the forward rotational direction and the reverse rotational direction, and vice versa. When the rotational direction of the motor 6 is switched, the rotational direction of the output shaft 8 is switched.

The control circuit board 16 includes a computer system. The control circuit board 16 outputs a control command for controlling the motor 6. The control circuit board 16 is housed in the control circuit board housing portion 23. The control circuit board 16 includes a substrate 16P on which a plurality of electronic components are mounted. Examples of the electronic components mounted on the substrate 16P include a processor such as a central processing unit (CPU), a non-transitory memory such as a read only memory (ROM) or a storage, a transitory memory such as a random access memory (RAM), a transistor, a capacitor, and a resistor.

The control circuit board case 17 houses the control circuit board 16. The control circuit board case 17 is disposed in the internal space of the control circuit board housing portion 23. At least part of the control circuit board 16 is housed in the control circuit board case 17.

Torque Sensor

Figure 5:
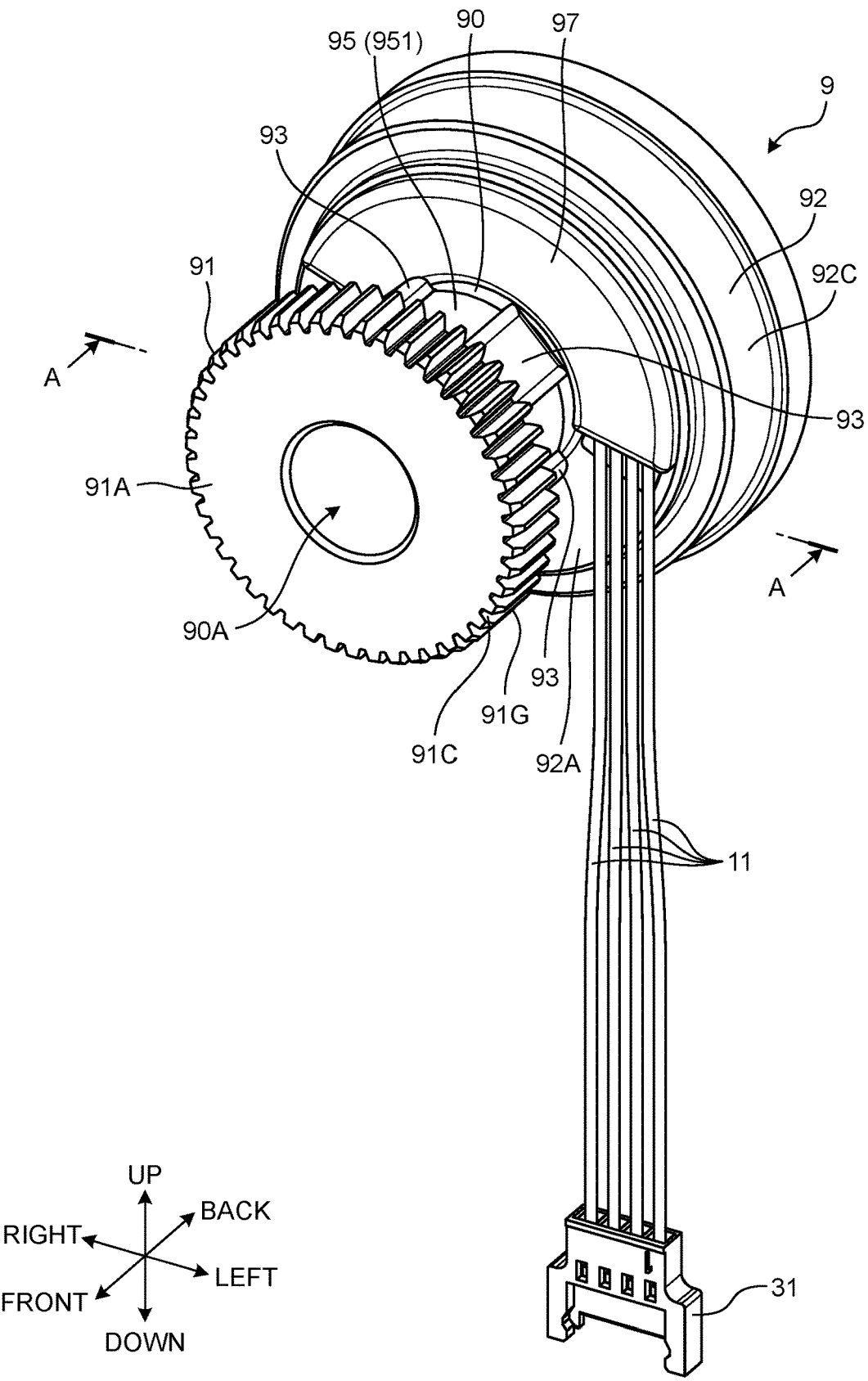
FIG. 5 is a front-left-side perspective view illustrating a torque sensor according to the first embodiment.
Figure 6:
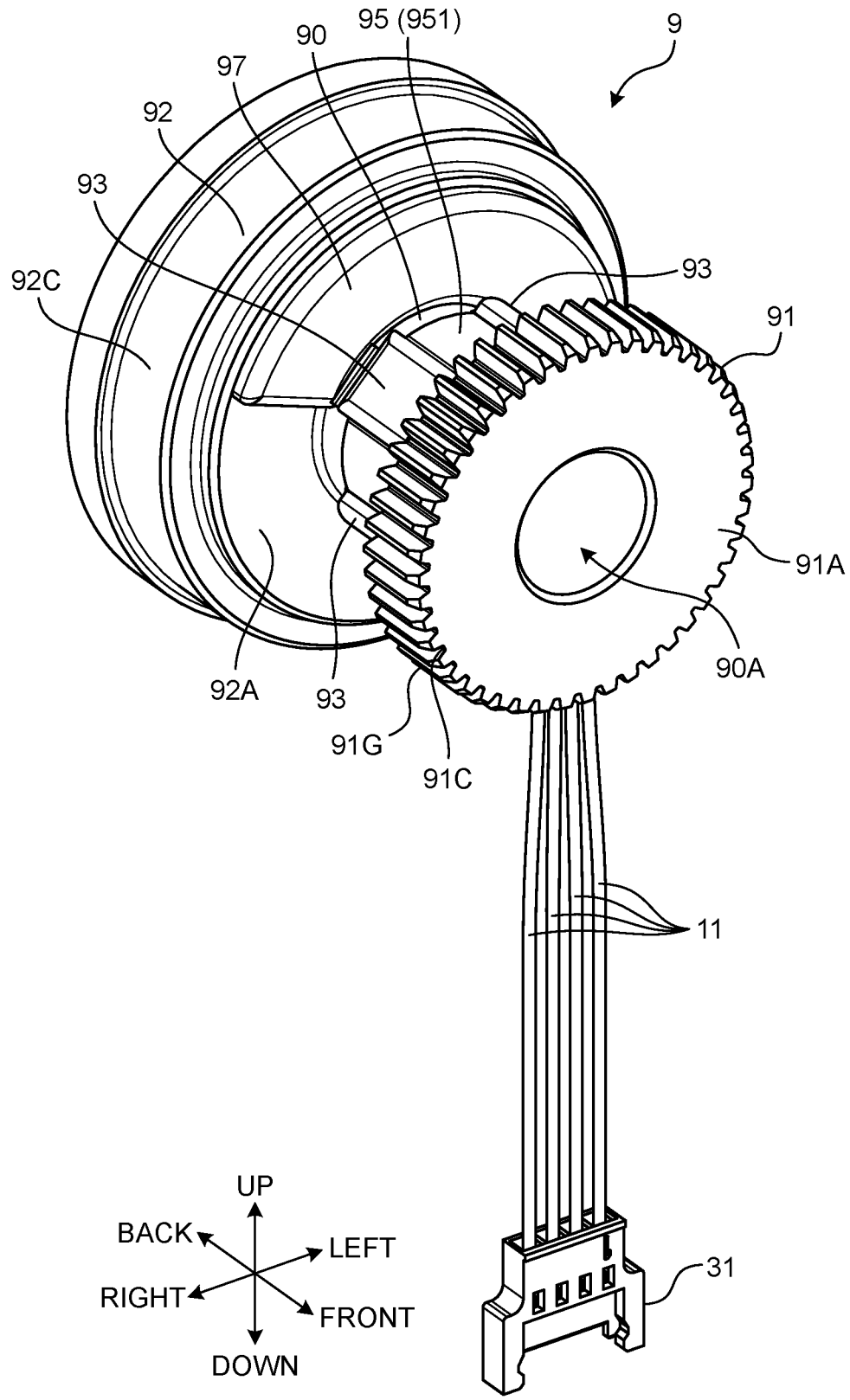
FIG. 6 is a front-right-side perspective view illustrating the torque sensor according to the first embodiment.
Figure 7:
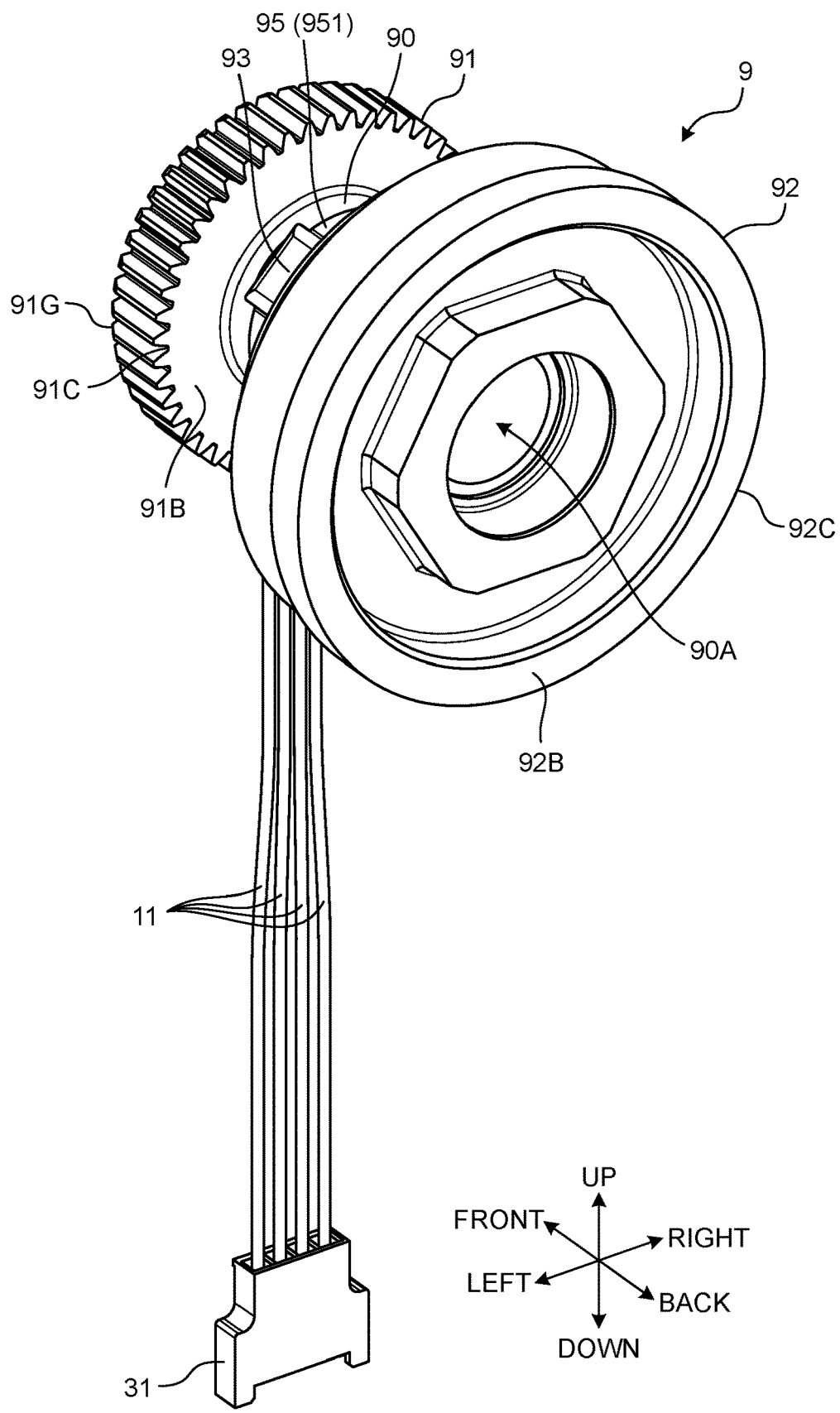
FIG. 7 is a back-left-side perspective view illustrating the torque sensor according to the first embodiment.
Figure 8:
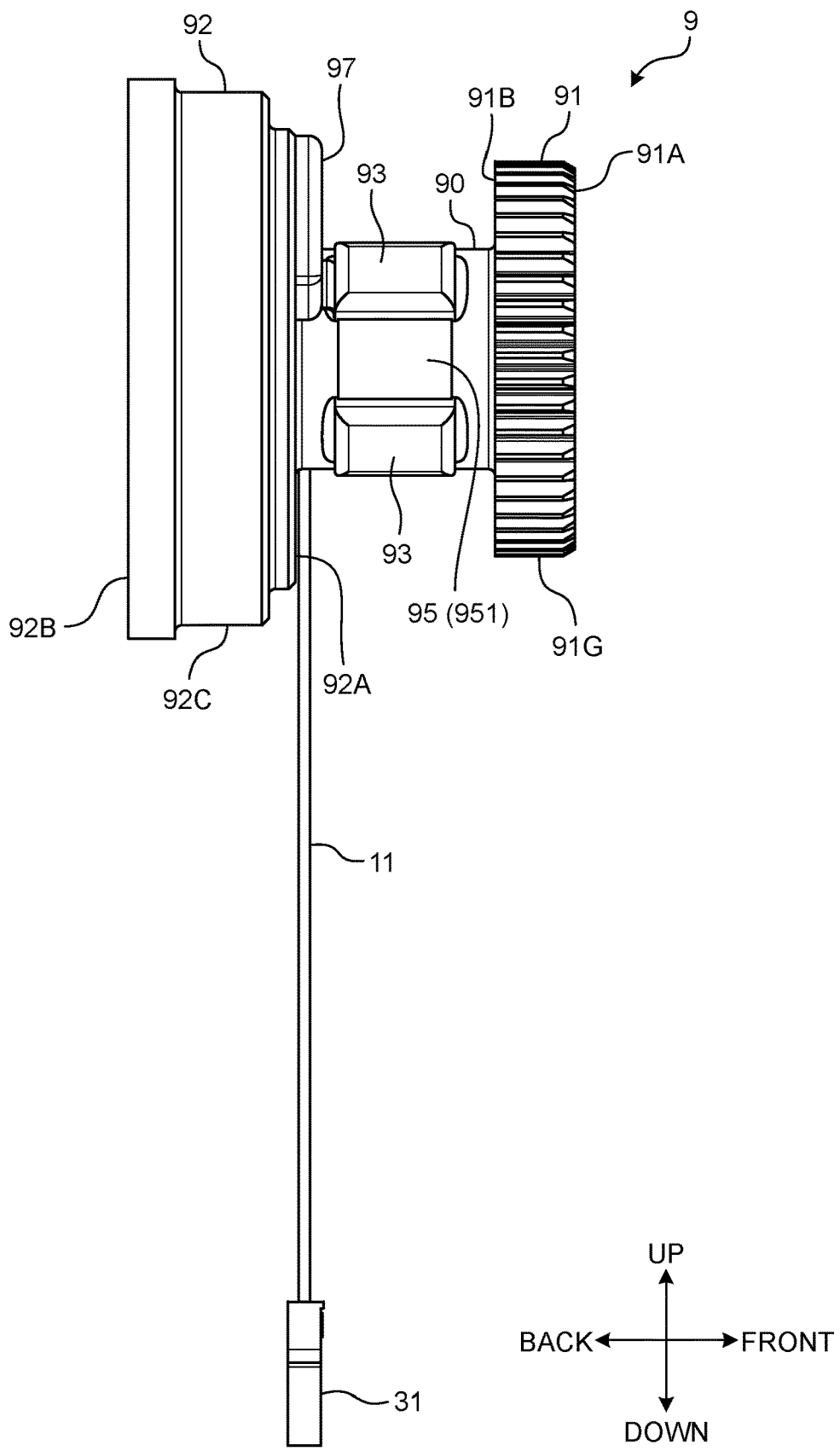
FIG. 8 is a right-side view illustrating the torque sensor according to the first embodiment.
Figure 9:
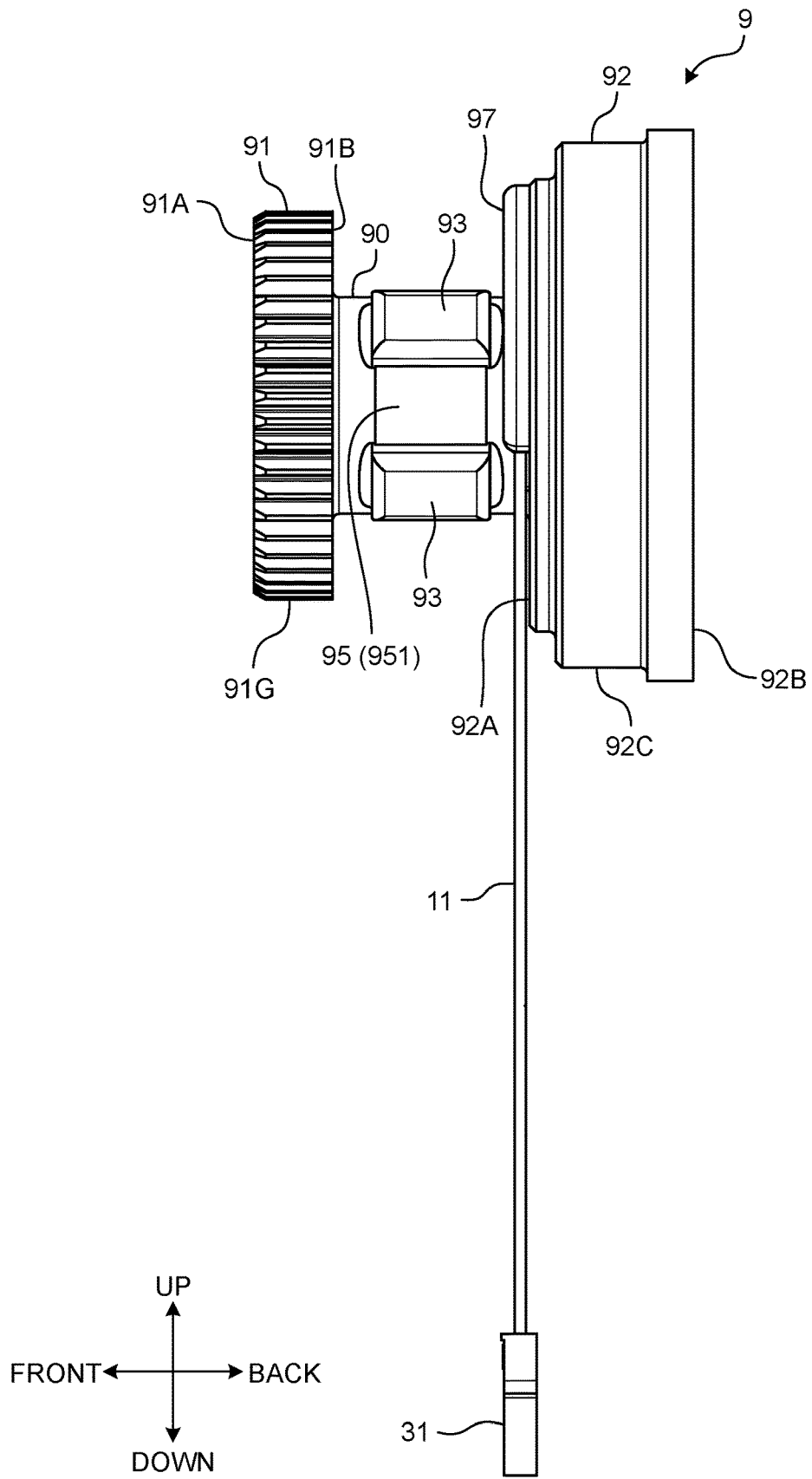
FIG. 9 is a left-side view illustrating the torque sensor according to the first embodiment.
Figure 10:
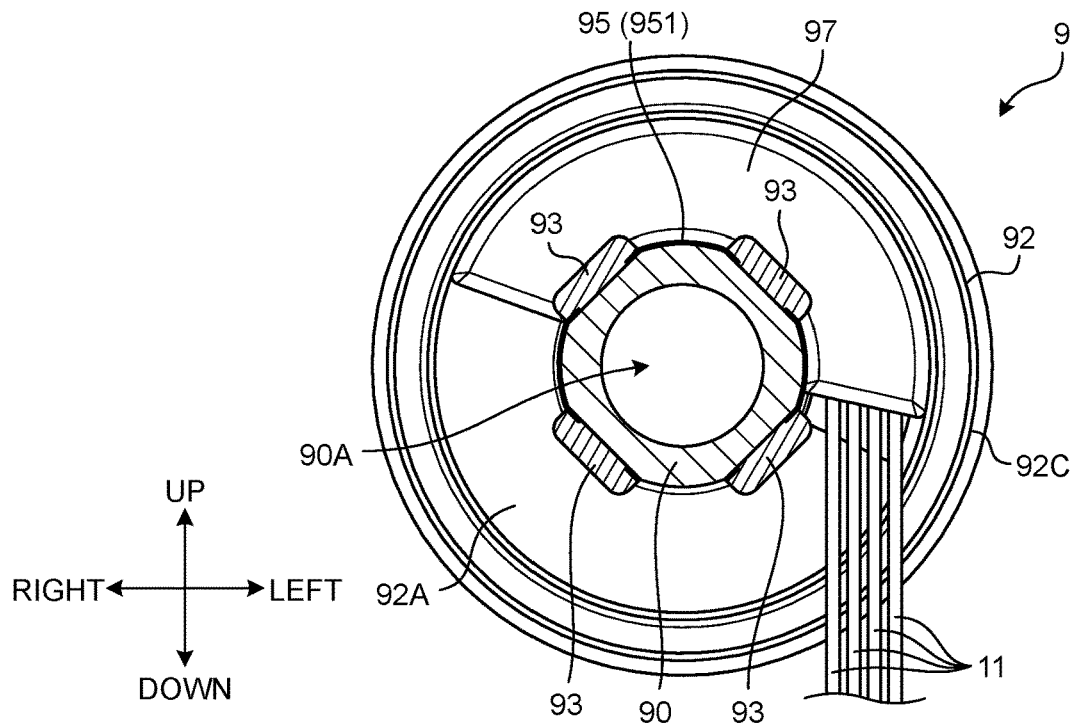
FIG. 10 is a cross-sectional view illustrating the torque sensor according to the first embodiment.
Figure 11:
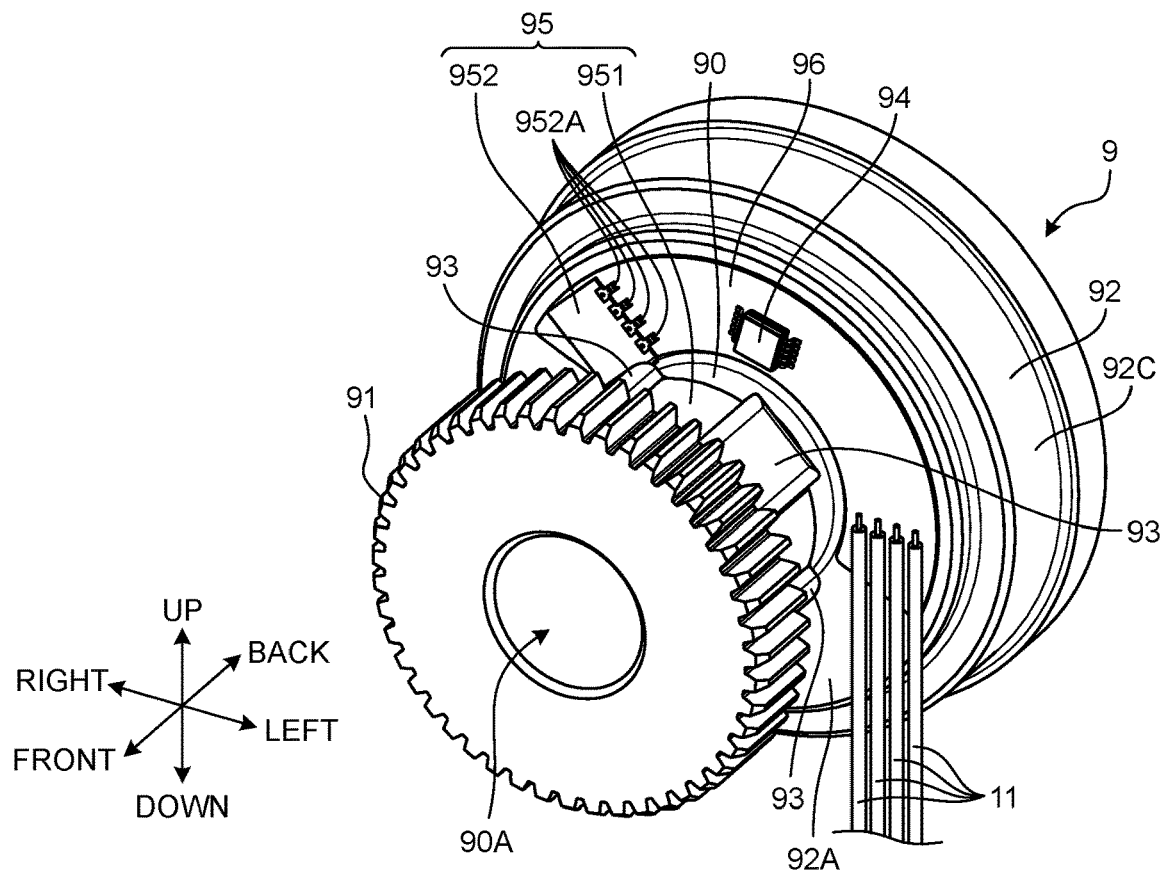
FIG. 11 is a front-left-side perspective view illustrating a state in which a cover is removed from the torque sensor according to the first embodiment.

FIG. 5 is a front-left-side perspective view illustrating the torque sensor 9 according to the present embodiment. FIG. 6 is a front-right-side perspective view illustrating the torque sensor 9 according to the present embodiment. FIG. 7 is a back-left-side perspective view illustrating the torque sensor 9 according to the present embodiment. FIG. 8 is a right-side view illustrating the torque sensor 9 according to the present embodiment. FIG. 9 is a left-side view illustrating the torque sensor 9 according to the present embodiment. FIG. 10 is a cross-sectional view illustrating the torque sensor 9 according to the present embodiment taken along line A-A in FIG. 5. FIG. 11 is a front-left-side perspective view illustrating a state in which the cover 97 is removed from the torque sensor 9 according to the present embodiment.

As illustrated in FIGS. 3, 4, 5, 6, 7, 8, 9, 10, and 11, the torque sensor 9 includes the twist portion 90, the plate portion 91, the plate portion 92, the strain gauge 93, the amplification circuit 94, a flexible substrate 95, a flexible substrate 96, the cover 97, the first lead lines 11, and the first connector 31.

The twist portion 90 is configured to be twisted by torque applied to the output shaft 8. The twist portion 90 is hollow. The twist portion 90 has a cylindrical shape. The central axis of the twist portion 90 coincides with the rotational axis AX. The twist portion 90 has a hole 90A in which the rotor shaft 63 is disposed. The hole 90A is a through-hole penetrating through front and back end parts of the twist portion 90. The hole 90A extends in the front-back direction. The bearing 64 is held behind the hole 90A. The front part of the rotor shaft 63 is disposed inward of the hole 90A of the twist portion 90.

The plate portion 91 is disposed around at a front end part of the twist portion 90. The plate portion 91 is integrally formed with the twist portion 90. The outer shape of the plate portion 91 is substantially circular. The outer diameter of the plate portion 91 is larger than that of the twist portion 90. The plate portion 91 has a front surface 91A, a back surface 91B, and an outer peripheral surface 91C. The front surface 91A faces inward. The front surface 91A is orthogonal to an axis parallel to the rotational axis AX. The back surface 91B faces backward. The back surface 91B is orthogonal to the axis parallel to the rotational axis AX. A gear 91G is provided on the outer peripheral surface 91C. The internal gear 70 is disposed around the plate portion 91. The gear 91G meshes with the internal gear 70. The torque sensor 9 is coupled to the internal gear 70 via the plate portion 91.

The plate portion 92 is disposed around a back end part of the twist portion 90. The plate portion 92 is integrally formed with the twist portion 90. The outer shape of the plate portion 92 is substantially circular. The outer diameter of the plate portion 92 is larger than that of the twist portion 90. The outer diameter of the plate portion 92 is larger than that of the plate portion 91. The plate portion 92 has a front surface 92A, a back surface 92B, and an outer peripheral surface 92C. The front surface 92A faces forward. The front surface 92A is orthogonal to the axis parallel to the rotational axis AX. The back surface 92B faces backward. The back surface 92B is orthogonal to the axis parallel to the rotational axis AX. The plate portion 92 is disposed forward of the fan 13. The plate portion 92 is fixed to the gear case 4.

The strain gauge 93 is disposed on the twist portion 90. The strain gauge 93 indirectly detects torque applied to the output shaft 8. A large signal (voltage) is output when the torque is large, whereas a small signal (voltage) is output when the torque is small. A signal (voltage) output from the strain gauge 93 includes a detection signal of the torque applied to the output shaft 8. The strain gauge 93 is fixed to the surface of the twist portion 90. The torque applied to the output shaft 8 is transmitted to the twist portion 90 through the planetary gear mechanism 7. Accordingly, the twist portion 90 is twisted by indirect application of the torque applied to the output shaft 8. The strain gauge 93 detects strain of the twist portion 90 to which the torque applied to the output shaft 8 is transmitted through the planetary gear mechanism 7 and that is indirectly twisted by the torque applied to the output shaft 8. In the present embodiment, a transmission element through which the torque applied to the output shaft 8 is transmitted to the twist portion 90 is the planetary gear mechanism 7, but may be any element other than the planetary gear mechanism 7, through which the torque is transmitted.

The amplification circuit 94 is disposed on the plate portion 92. In the present embodiment, the amplification circuit 94 is disposed on the front surface 92A of the plate portion 92. The amplification circuit 94 is disposed inside the gear case 4. The signal (voltage) from the strain gauge 93 is input to the amplification circuit 94. The amplification circuit 94 amplifies the signal from the strain gauge 93.

The flexible substrate 95 is a flexible printed circuit (FPC). The flexible substrate 95 includes a base film, and wires provided to the base film. The base film is formed of an insulating material. The wire is formed of a conductive material. The base film is flexible. The flexible substrate 95 is bendable.

Similarly to the flexible substrate 95, the flexible substrate 96 is a flexible printed circuit (FPC). The flexible substrate 96 includes a base film, and wires provided to the base film.

The flexible substrate 95 includes a first part 951 disposed on the surface of the twist portion 90, and a second part 952 connected to the flexible substrate 96. The first part 951 is disposed in a state of being bent on the surface of the twist portion 90. The first part 951 is fixed to the surface of the twist portion 90 by, for example, a bonding agent.

As illustrated in FIG. 11, the flexible substrate 96 is disposed on part of the front surface 92A of the plate portion 92. The flexible substrate 96 has an arc shape on a plane orthogonal to the rotational axis AX. The flexible substrate 96 is disposed without being bent on the front surface 92A of the plate portion 92. The flexible substrate 96 is fixed to the front surface 92A of the plate portion 92 by, for example, a bonding agent. The second part 952 of the flexible substrate 95 is connected to the flexible substrate 96.

The strain gauge 93 is fixed on the flexible substrate 95. The strain gauge 93 is fixed to the surface of the twist portion 90 via the flexible substrate 95.

The amplification circuit 94 is fixed on the flexible substrate 96. The amplification circuit 94 is fixed to the front surface 92A of the plate portion 92 via the flexible substrate 96.

Four of the strain gauges 93 are disposed in the circumferential direction. The four strain gauges 93 are arranged in the circumferential direction of the twist portion 90 on the first part 951 of the flexible substrate 95 that is bent. The four strain gauges 93 are disposed at equal intervals of 90° in the circumferential direction.

The amplification circuit 94 is disposed on the plate portion 92 without being bent. The amplification circuit 94 is disposed on the front surface 92A of the plate portion 92 while the flexible substrate 96 is not bent.

The cover 97 is disposed to cover the amplification circuit 94 and the flexible substrate 96. The cover 97 is fixed to the plate portion 92 while covering the amplification circuit 94 and the flexible substrate 96. The cover 97 protrudes forward from the front surface 92A of the plate portion 92.

A plurality of the first lead lines 11 are provided. An upper end part of each first lead line 11 is fixed to the flexible substrate 96. The upper end part of each first lead line 11 is connected to the amplification circuit 94 through the wires of the flexible substrate 96. A lower end part of each first lead line 11 is connected to the first connector 31. The first connector 31 is connected to the second connector 32. The second connector 32 is connected to the control circuit board 16 through the second lead lines 12.

When the twist portion 90 is twisted by torque applied to the output shaft 8, the strain gauges 93 output a signal corresponding to the torque. The signal from the strain gauges 93 is input to the amplification circuit 94. The amplification circuit 94 transmits the amplified signal from the strain gauges 93 to the control circuit board 16. The amplification circuit 94 outputs a detection signal of the torque applied to the output shaft 8. This detection signal from the torque sensor 9 includes the signal from the strain gauges 93, which is amplified by the amplification circuit 94.

The amplification circuit 94 transmits the amplified signal from the strain gauges 93 to the control circuit board 16. The signal (voltage) input from the amplification circuit 94 to the control circuit board 16 is higher than the signal (voltage) input from the strain gauges 93 to the amplification circuit 94. The signal from the strain gauges 93, which is amplified by the amplification circuit 94, is transmitted to the control circuit board 16 through the first lead lines 11, the first connector 31, the second connector 32, and the second connector 32.

Figure 12:
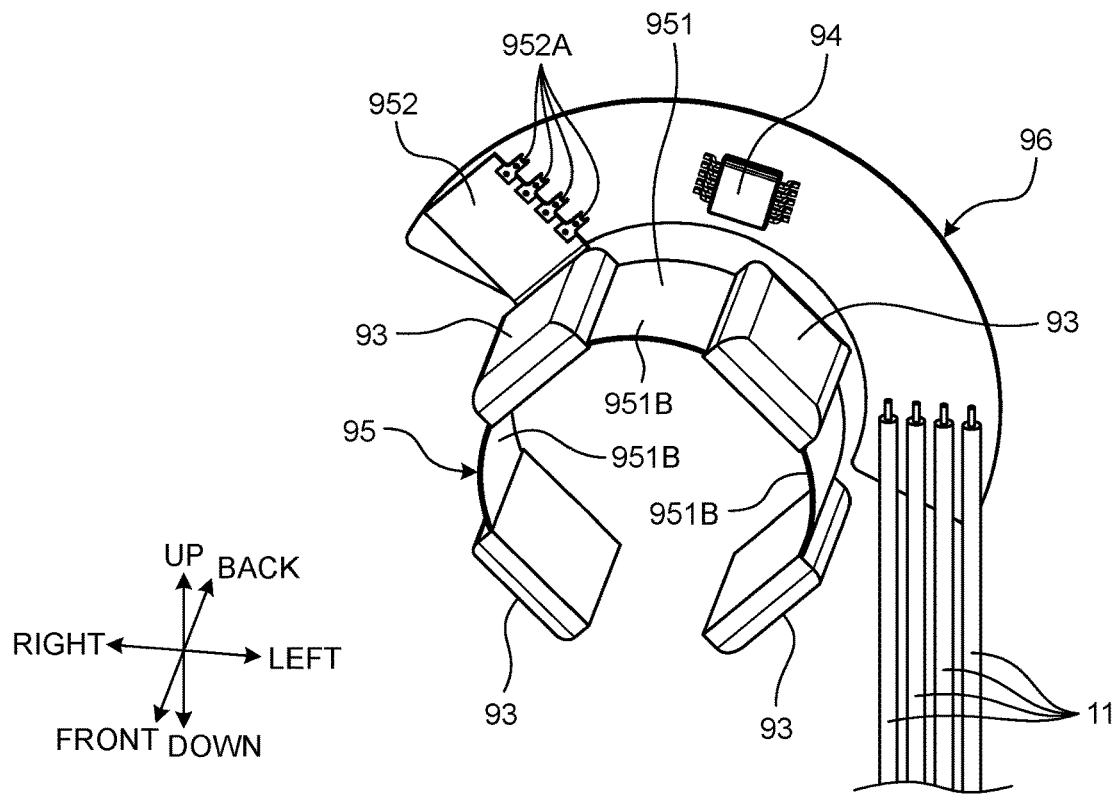
FIG. 12 is a front-left-side perspective view illustrating a flexible substrate to which strain gauges are fixed and a flexible substrate to which an amplification circuit is fixed according to the first embodiment.
Figure 13:
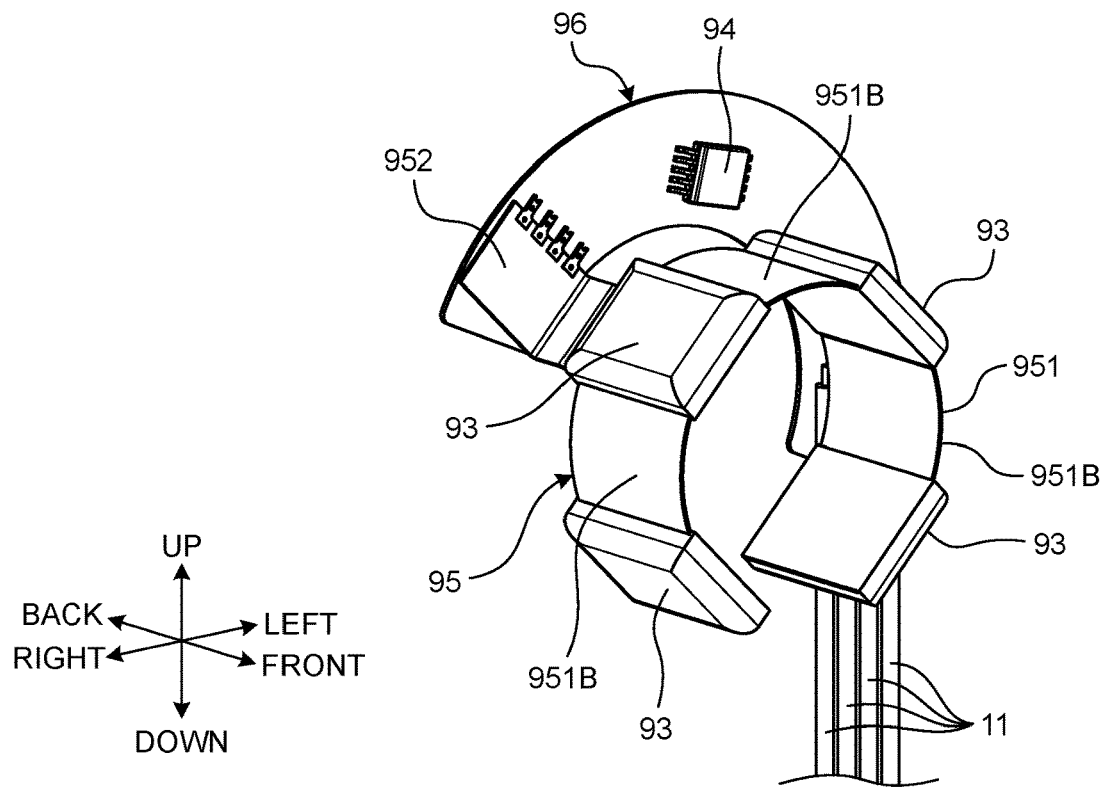
FIG. 13 is a front-right-side perspective view illustrating the flexible substrate to which the strain gauges are fixed and the flexible substrate to which the amplification circuit is fixed according to the first embodiment.
Figure 14:
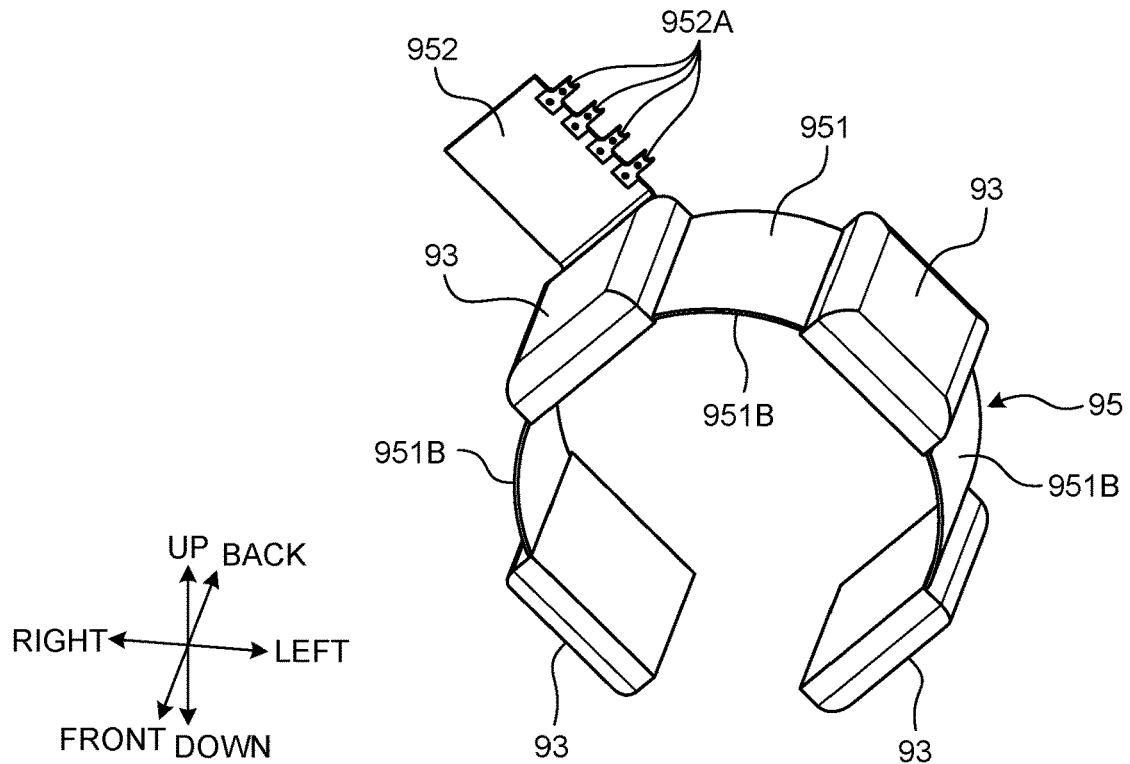
FIG. 14 is a front-left-side perspective view illustrating the flexible substrate to which the strain gauges are fixed according to the first embodiment.
Figure 15:
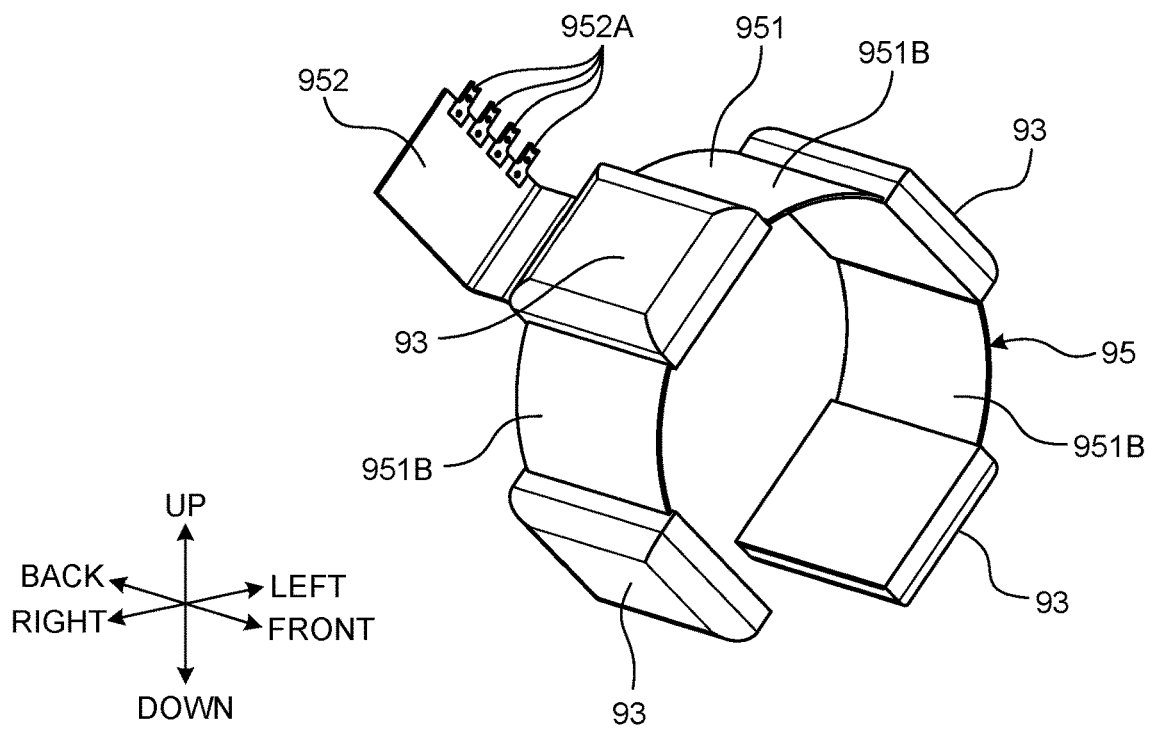
FIG. 15 is a front-right-side perspective view illustrating the flexible substrate to which the strain gauges are fixed according to the first embodiment.
Figure 16:
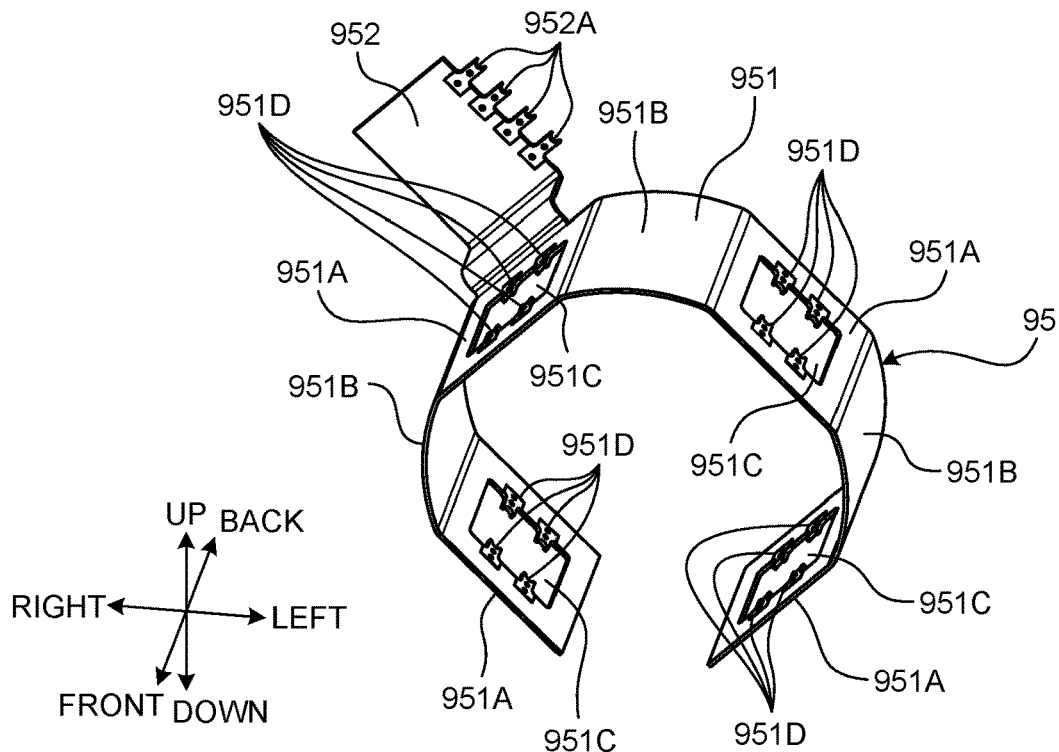
FIG. 16 is a front-left-side perspective view illustrating the flexible substrate according to the first embodiment.
Figure 17:
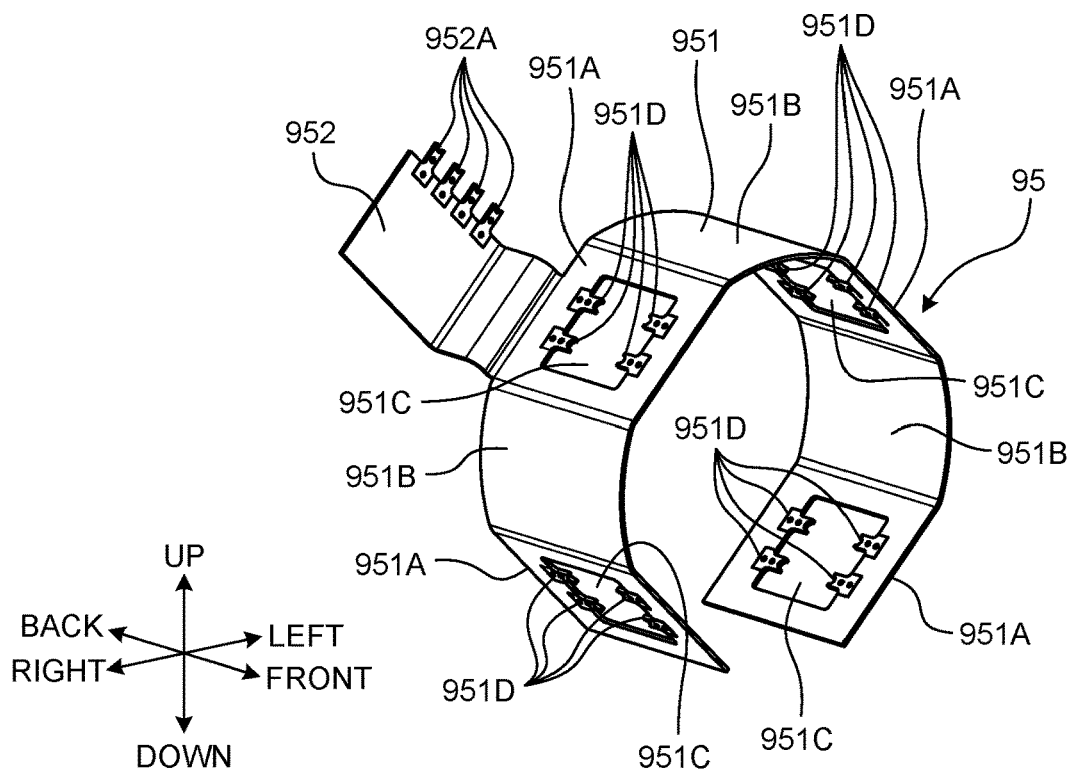
FIG. 17 is a front-right-side perspective view illustrating the flexible substrate according to the first embodiment.

FIG. 12 is a front-left-side perspective view illustrating the flexible substrate 95 to which the strain gauges 93 are fixed and the flexible substrate 96 to which the amplification circuit 94 is fixed according to the present embodiment. FIG. 13 is a front-right-side perspective view illustrating the flexible substrate 95 to which the strain gauges 93 are fixed and the flexible substrate 96 to which the amplification circuit 94 is fixed according to the present embodiment. FIG. 14 is a front-left-side perspective view illustrating the flexible substrate 95 to which the strain gauges 93 are fixed according to the present embodiment. FIG. 15 is a front-right-side perspective view illustrating the flexible substrate 95 to which the strain gauges 93 are fixed according to the present embodiment. FIG. 16 is a front-left-side perspective view illustrating the flexible substrate 95 according to the present embodiment. FIG. 17 is a front-right-side perspective view illustrating the flexible substrate 95 according to the present embodiment.

The first part 951 is disposed on part of the circumference of the twist portion 90. The first part 951 is disposed in a state of being bent on part of the surface of the twist portion 90. The first part 951 includes support parts 951A and bent parts 951B.

The strain gauges 93 are respectively supported to the support parts 951A. Four of the support parts 951A are provided at intervals in the circumferential direction. Each support part 951A has a flat surface. Each support part 951A includes an opening 951C and terminals 951D. The terminals 951D are connected to the wires of the flexible substrate 95. At least part of the strain gauge 93 is disposed inward of the opening 951C. The strain gauge 93 is fixed to the surface of the support part 951A in a state in which at least part of the strain gauge 93 is disposed inward of the opening 951C. At least part of the strain gauge 93 is fixed to the surface of the twist portion 90 through the opening 951C. The strain gauge 93 is connected to the terminals 951D in a state in which at least part of the strain gauge 93 is disposed inward of the opening 951C. When the strain gauge 93 is connected to the terminals 951D, the strain gauge 93 is connected to the wires of the flexible substrate 95.

Each bent part 951B is disposed between the corresponding two adjacent support parts 951A. Three of the bent parts 951B are provided at intervals along the circumferential direction. Each bent part 951B is bent in such an arc shape that the bent part 951B is in contact with the surface of the twist portion 90.

The second part 952 is provided so as to protrude outward in the radial direction from part of a back end part of the first part 951. The second part 952 has a flat surface. The second part 952 includes terminals 952A connected to the wires of the flexible substrate 96. The terminals 952A are connected to the wires of the flexible substrate 95. The wires of the flexible substrate 95 and the wires of the flexible substrate 96 are connected to each other through connection of the wires of the flexible substrate 96 and the terminals 952A.

The amplification circuit 94 is supported by the flexible substrate 96. The flexible substrate 96 has a flat surface. The amplification circuit 94 is connected to the wires of the flexible substrate 96. Each strain gauge 93 is connected to the amplification circuit 94 through the terminals 951D, the wires of the flexible substrate 95, the terminals 952A, and the wires of the flexible substrate 96.

Figure 18:
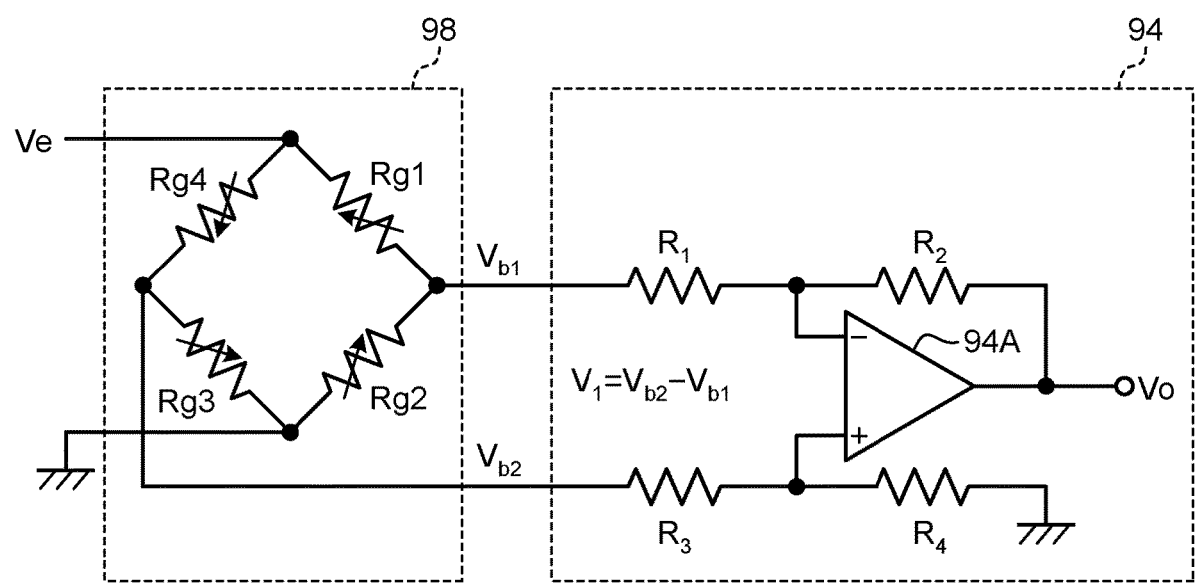
FIG. 18 is a circuit diagram illustrating the strain gauges and the amplification circuit according to the first embodiment.

FIG. 18 is a circuit diagram illustrating the strain gauges 93 and the amplification circuit 94 according to the present embodiment. Resistors of the four strain gauges 93 are denoted by $R_{g1}$, $R_{g2}$, $R_{g3}$, and $R_{g4}$, respectively. The four strain gauges 93 form a bridge circuit 98. The four strain gauges 93 are connected to each other by what is called a four-active-gauge method.

When the twist portion 90 is twisted, the strain gauges 93 are strained, and accordingly, the values of the resistors $R_{g1}$, $R_{g2}$, $R_{g3}$, and $R_{g4}$ change. When the values of the resistors $R_{g1}$, $R_{g2}$, $R_{g3}$, and $R_{g4}$ change while bridge voltage $V_e$ is input to the bridge circuit 98, voltage $V_{b1}$ between the resistors $R_{g1}$ and $R_{g2}$ and voltage $V_{b2}$ between the resistors $R_{g3}$ and $R_{g4}$ change. Output voltage $V_1$ of the bridge circuit 98 is equal to the difference between the voltages $V_{b1}$ and $V_{b2}$ ($V_1 = V_{b2} - V_{b1}$).

The amplification circuit 94 includes a resistor $R_1$, a resistor $R_2$, a resistor $R_3$, a resistor $R_4$, and an operational amplifier 94A. The resistor $R_1$, the resistor $R_2$, the resistor $R_3$, the resistor $R_4$, and the operational amplifier 94A are each supported to the base film of the flexible substrate 96. The operational amplifier 94A receives, as a first input signal, the voltage $V_{b1}$ through the resistor $R_1$ and receives, as a second input signal, the voltage $V_{b2}$ through the resistor $R_3$. Voltage $V_o$ obtained through amplification is output from the operational amplifier 94A. The voltage $V_o$ corresponds to the amplified signal from the strain gauges 93. The voltage $V_o$ is transmitted to the control circuit board 16 through the first lead lines 11 and the first connector 31. The amplification circuit 94 is not limited to the illustrated amplification circuit but may be, for example, a programmable gain amplifier (PGA). A filter circuit may be provided between the bridge circuit 98 and the amplification circuit 94. In this case, noise influence to be described later can be further reduced.

Operation

In screwing work, the control circuit board 16 starts the motor 6 to rotate the output shaft 8 based on an manipulation signal from the trigger switch 14. Torque applied to the output shaft 8 increases as a screw is screwed into a work target in the screwing work. The torque applied to the output shaft 8 is transmitted to the internal gear 70 through the carrier 72C and the planetary gears 72P. Torque applied to the internal gear 70 is transmitted to the torque sensor 9 through the plate portion 91. The torque applied to the output shaft 8 is detected by the torque sensor 9.

The plate portion 92 of the torque sensor 9 is fixed to the gear case 4. The twist portion 90 of the torque sensor 9 is twisted in the rotational direction by the internal gear 70. The plate portion 91 and the plate portion 92 also receive torque, but the diameters of the plate portion 91 and the plate portion 92 are larger than that of the twist portion 90. Thus, twist deformation of the plate portion 91 and the plate portion 92 is smaller than that of the twist portion 90. As the twist portion 90 of the torque sensor 9 is twisted in the rotational direction, the four strain gauges 93 disposed on the surface of the twist portion 90 deform. Upon the deformation of the strain gauges 93, a signal (voltage) representing torque applied to the twist portion 90 is input from the strain gauges 93 to the amplification circuit 94. The signal from the strain gauges 93 is amplified by the amplification circuit 94. After amplified by the amplification circuit 94, the signal from the strain gauges 93 is transmitted to the control circuit board 16 through the first lead lines 11, the first connector 31, the second connector 32, and the second connector 32.

The control circuit board 16 acquires this detection signal from the torque sensor 9. The control circuit board 16 calculates, based on the detection signal from the torque sensor 9, torque applied to the output shaft 8. Target torque is registered in advance in the control circuit board 16. The control circuit board 16 controls the motor 6 based on the detection signal from the torque sensor 9 so that the screw is screwed into the work target with the target torque.

When having determined that the torque applied to the output shaft 8 has reached the target torque based on the detection signal from the torque sensor 9, the control circuit board 16 stops drive of the motor 6. In this manner, the control circuit board 16 can control the motor 6 based on the detection signal from the torque sensor 9 so that the screw is screwed into the work target with the target torque.

In the present embodiment, the screwing machine 1 includes a wireless communication device (not illustrated). The wireless communication device is disposed at a defined site of the housing 2. The wireless communication device can perform short-distance wireless communication by a communication scheme that does not require a radio license. The wireless communication device can perform wireless communication by a communication scheme compliant with, for example, IEEE802.15.1 standard, which is standardized by Institute of Electrical and Electronics Engineers (IEEE).

The control circuit board 16 transmits the detection signal of the torque sensor 9 to the wireless communication device. The wireless communication device transmits the detection signal of the torque sensor 9 to a management computer disposed outside the screwing machine 1. The management computer records the detection signal of the torque sensor 9 in the screwing work.

Advantageous Effects

As described above, according to the present embodiment, the strain gauges 93 are disposed on the twist portion 90. The amplification circuit 94 is disposed on the plate portion 92. The plate portion 92 is integrally formed with the twist portion 90. The amplification circuit 94 is disposed near the strain gauges 93. This configuration shortens the distance from the strain gauges 93 to the amplification circuit 94, thereby reducing influence of noise on a signal input from the strain gauges 93 to the amplification circuit 94.

The strain gauges 93 and the amplification circuit 94 are each fixed to the flexible substrate (95 or 96). A signal from the strain gauges 93 is input to the amplification circuit 94 through the wires of the flexible substrate 95 and the wires of the flexible substrate 96. Since the signal from the strain gauges 93 is input to the amplification circuit 94 through the wires of the flexible substrates 95 and 96, influence of noise on the signal input from the strain gauges 93 to the amplification circuit 94 is reduced.

The four strain gauges 93 are disposed. The four strain gauges 93 are arranged along the circumferential direction of the twist portion 90 by bending the first part 951 of the flexible substrate 95. After the strain gauges 93 are fixed to the support parts 951A of the first part 951, the bent parts 951B are bent so that the four strain gauges 93 are arranged along the circumferential direction of the twist portion 90.

The amplification circuit 94 is disposed on the front surface 92A of the plate portion 92 while the flexible substrate 96 is not bent. Accordingly, stress applied to the amplification circuit 94 is reduced. After the amplification circuit 94 is fixed to the flexible substrate 96, the flexible substrate 96 is connected to the front surface 92A of the plate portion 92 so that the amplification circuit 94 is disposed on the plate portion 92.

The first lead lines 11 are connected to the amplification circuit 94. The first lead lines 11 are connected to the first connector 31. The second lead lines 12 are connected to the control circuit board 16 for controlling the motor 6. The second lead lines 12 are connected to the second connector 32. The first connector 31 is connected to the second connector 32. Accordingly, the signal from the strain gauges 93, which is amplified by the amplification circuit 94 is transmitted to the control circuit board 16 through the first lead lines 11, the first connector 31, the second connector 32, and the second lead lines 12.

The first lead lines 11 and the second lead lines 12 connecting the amplification circuit 94 and the control circuit board 16 are unlikely to be largely affected by noise. This is because, when noise at the same level is applied to the flexible substrates (95 and 96) and the lead lines (11 and 12), influence on voltage before amplification is relatively large whereas influence on voltage after amplification (which is higher voltage) is relatively small. Thus, when the torque sensor 9 and the control circuit board 16 are separated from each other at a defined distance, it is important that the distance from the strain gauges 93 to the amplification circuit 94 is short, but it is relatively not important that the lengths of the lead lines (11 and 12) connecting the amplification circuit 94 and the control circuit board 16 are short.

The torque sensor 9 is coupled to the output shaft 8 via the planetary gear mechanism 7. Accordingly, torque applied to the output shaft 8 is transmitted to the torque sensor 9 via the planetary gear mechanism 7.

The planetary gear mechanism 7 includes the sun gear 72S that rotates by rotational force generated by the motor 6, the internal gear 70 disposed around the sun gear 72S, the planetary gears 72P disposed between the sun gear 72S and the internal gear 70, and the carrier 72C supporting the planetary gears 72P. The carrier 72C is connected to the output shaft 8. The internal gear 70 is coupled to the torque sensor 9. Accordingly, rotation generated by the motor 6 is transmitted to the output shaft 8, and torque applied to the output shaft 8 is transmitted to the torque sensor 9.

The torque sensor 9 has a tubular shape and is disposed around the rotor shaft 63. The front end part of the rotor shaft 63 is coupled to the sun gear 72S via the pinion gear 71S, the planetary gears 71P, and the carrier 71C. Accordingly, increase of the dimension of the screwing machine 1 in the front-back direction is prevented.

The plate portion 91 is connected to the front end part of the twist portion 90, and the plate portion 92 is connected to the back end part of the twist portion 90. The internal gear 70 meshes with the gear 91G provided on the plate portion 91. The twist portion 90 is coupled to the internal gear 70 via the plate portion 91. The plate portion 92 is fixed to the gear case 4. Thus, when torque is applied to the output shaft 8, the twist portion 90 can receive the torque via the internal gear 70 so that the twist portion 90 is twisted in the rotational direction. Thus, the strain gauges 93 disposed at the twist portion 90 can excellently detect the torque applied to the output shaft 8.

Second Embodiment

A second embodiment will be described below. In the following description, any component identical or equivalent to that in the above-described embodiment is denoted by the same reference sign, and description of the component is simplified or omitted.

Figure 19:
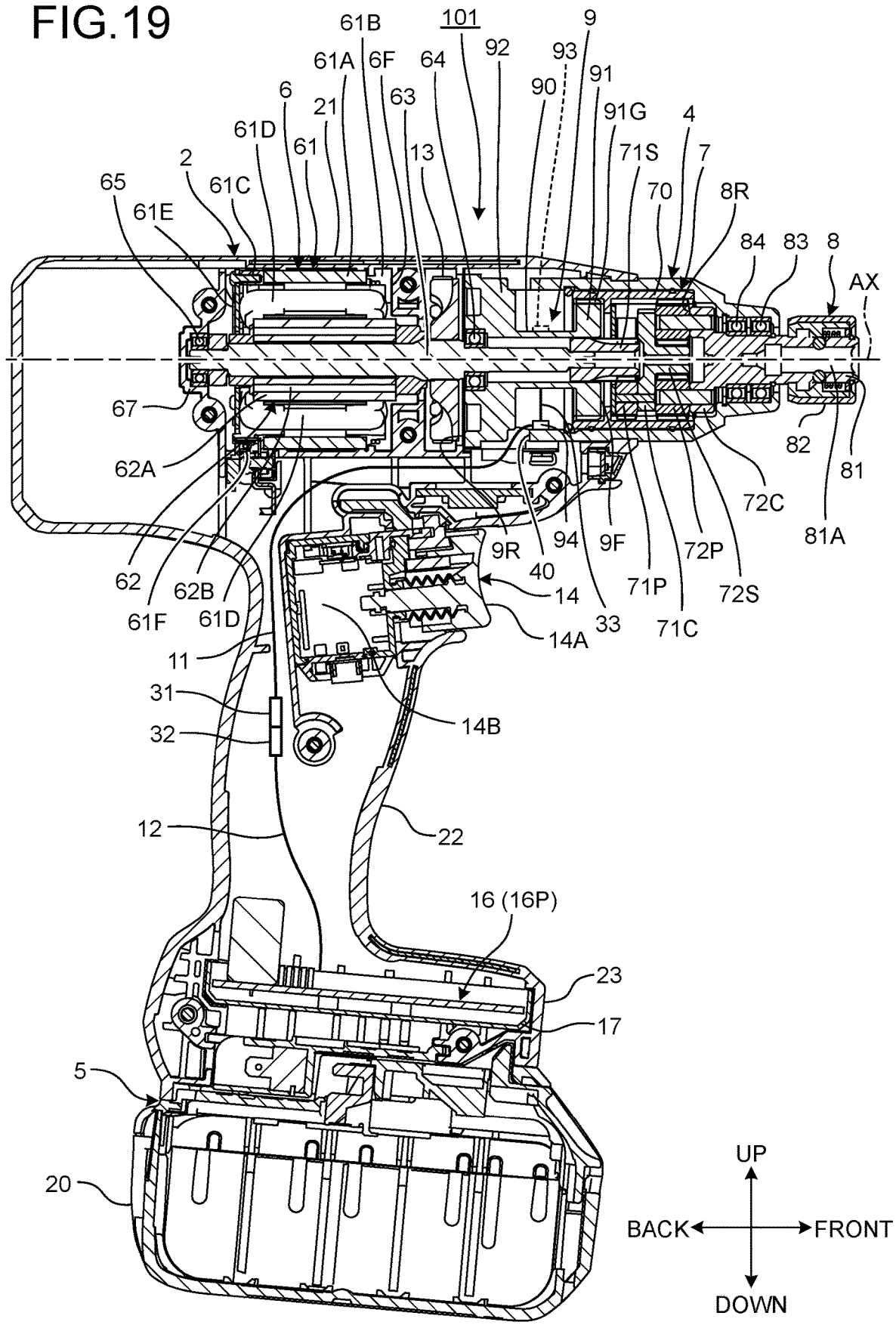
FIG. 19 is a cross-sectional view illustrating a screwing machine according to a second embodiment.

FIG. 19 is a cross-sectional view illustrating a screwing machine 101 according to the present embodiment. The screwing machine 101 includes the housing 2, the gear case 4, the battery mounting portion 5, the motor 6, the planetary gear mechanism 7, the output shaft 8, the torque sensor 9, the first lead lines 11, the second lead lines 12, the fan 13, the trigger switch 14, the forward-reverse change lever 15, the control circuit board 16, and the control circuit board case 17.

The gear case 4 houses the torque sensor 9, the planetary gear mechanism 7, and part of the output shaft 8. The twist portion 90 of the torque sensor 9 is housed in the gear case 4. The twist portion 90 is twisted by torque applied to the output shaft 8. Similarly to the above-described embodiment, the strain gauges 93 are disposed on the twist portion 90.

The amplification circuit 94 is disposed inside the gear case 4. In an example illustrated in FIG. 19, the amplification circuit 94 is disposed at a lower part inside the gear case 4. In the present embodiment, the amplification circuit 94 is fixed to the inner surface of the gear case 4. A signal from the strain gauges 93 is input to the amplification circuit 94 through a lead line 33.

The hole 40 is formed in the gear case 4. The hole 40 is formed so as to connect the inside and outside of the gear case 4. The first lead lines 11 are connected to the amplification circuit 94. The first lead lines 11 extend outward through the hole 40. One end part of each first lead line 11 is disposed inside the gear case 4 and connected to the amplification circuit 94. The other end part of the first lead line 11 is disposed outside the gear case 4.

The other end part of each first lead line 11 is connected to the first connector 31. The second lead lines 12 are connected to the control circuit board 16. The second lead lines 12 are connected to the second connector 32. The first connector 31 is connected to the second connector 32. After amplified by the amplification circuit 94, the signal from the strain gauges 93 is transmitted to the control circuit board 16 through the first lead lines 11, the first connector 31, the second connector 32, and the second lead lines 12.

As described above, according to the present embodiment, the twist portion 90 is disposed inside the gear case 4. The strain gauges 93 are disposed on the twist portion 90. The amplification circuit 94 is disposed inside the gear case 4. The amplification circuit 94 is disposed near the strain gauges 93. This configuration shortens the distance from the strain gauges 93 to the amplification circuit 94, thereby reducing influence of noise on a signal input from the strain gauges 93 to the amplification circuit 94.

In the present embodiment as well, the first lead lines 11 and the second lead lines 12 connecting the amplification circuit 94 and the control circuit board 16 are unlikely to be largely affected by noise. This is because, when noise at the same level is applied to the lead line 33 and the lead lines (11 and 12), influence on voltage before amplification is relatively large whereas influence on voltage after amplification (which is higher voltage) is relatively small. Thus, when the torque sensor 9 and the control circuit board 16 are separated from each other at a defined distance, it is important that the distance from the strain gauges 93 to the amplification circuit 94 is short, but it is relatively not important that the lengths of the lead lines (11 and 12) connecting the amplification circuit 94 and the control circuit board 16 are short.

Other Embodiments

In the embodiments described above, the amplification circuit 94 may be disposed on the back surface 91B of the plate portion 91.

In the embodiments described above, the amplification circuit 94 may be disposed on the surface of the twist portion 90.

In the embodiments described above, as the screwing machine (1, 101), an electric driver has been described for example. The screwing machine (1, 101) only needs to include the motor 6 and the output shaft 8 that rotates by rotational force generated by the motor 6. The screwing machine (1, 101) may be at least one of a vibration driver drill, an angle drill, an impact driver, a hammer drill, a circular saw, and a reciprocating saw.

In the embodiments described above, the battery pack 20 mounted on the battery mounting portion 5 is used as the power source of the screwing machine (1, 101). A commercial power source (alternating-current power source) may be used as the power source of the screwing machine (1, 101).

In the embodiments described above, the motor 6 is an electric motor, and the screwing machine (1, 101) is an electric tool, the power source of which is the motor 6. The power source of the screwing machine (1, 101) may be an air motor. However, the power source of the screwing machine (1, 101) is not limited to an electric motor nor an air motor but may be another power source. The power source of the screwing machine (1, 101) may be, for example, a hydraulic motor or a motor driven by an engine.

According to the present disclosure, it is possible to reduce influence of noise on a torque detection signal input to an amplification circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A screwing machine comprising:
a motor;
an output shaft that is driven by the motor and to which a bit is attachable;
a twist portion that is hollow, to which torque applied to the output shaft is transmitted through a transmission element, and that is configured to be indirectly twisted about a central axis by the torque applied to the output shaft;
a plate portion integrally formed with the twist portion and including a first surface that is perpendicular to the central axis;
a strain gauge disposed on the twist portion; and
an amplification circuit that is disposed on the first surface of the plate portion and has a largest face that faces the first surface and to which a signal from the strain gauge is input.

2. The screwing machine according to claim 1, wherein the strain gauge and the amplification circuit are each fixed on a flexible substrate.

3. The screwing machine according to claim 2, wherein the strain gauge includes four strain gauges that are arranged on the flexible substrate that is bent, along a circumferential direction of the twist portion.

4. The screwing machine according to claim 2, wherein the amplification circuit is disposed on the plate portion without being bent.

5. The screwing machine according to claim 2, wherein
the flexible substrate includes a first flexible substrate to which the strain gauge is fixed, and a second flexible substrate to which the amplification circuit is fixed,
the first flexible substrate includes a first part disposed on the surface of the twist portion, and a second part connected to the second flexible substrate,
the second flexible substrate is disposed on the plate portion,
the strain gauge is fixed to the twist portion through the first part of the first flexible substrate, and
the amplification circuit is fixed to the first surface of the plate portion through the second flexible substrate.

6. The screwing machine according to claim 5, wherein
the strain gauge includes four strain gauges that are disposed in a circumferential direction of the twist portion, and
the four strain gauges are arranged on the first part that is bent, along the circumferential direction of the twist portion.

7. The screwing machine according to claim 6, wherein the first part includes
four support parts that are provided at intervals in the circumferential direction of the twist portion and that respectively support the four strain gauges, and
bent parts that are disposed between two adjacent support parts of the four support parts,
each of the support parts has a flat surface, and
each of the bent parts is bent so as to be in contact with the surface of the twist portion.

8. The screwing machine according to claim 7, wherein
each of the support parts includes an opening and a first terminal that is connected to wire of the first flexible substrate,
at least part of the strain gauge is fixed to the surface of the twist portion through the opening, and
the strain gauge is connected to the first terminal in a state in which at least part of the strain gauge is disposed inward of the opening.

9. The screwing machine according to claim 5, wherein the amplification circuit is disposed on the first surface of the plate portion while the second flexible substrate is not bent.

10. The screwing machine according to claim 5, wherein
the second part is provided so as to protrude outward from part of the first part,
the second part has a flat surface,
the second part includes a second terminal that is connected to wire of the second flexible substrate, and
the second terminal is connected to the wire of the first flexible substrate.

11. The screwing machine according to claim 5, further comprising a cover that is disposed to cover the amplification circuit and the second flexible substrate.

12. The screwing machine according to claim 1, further comprising a control circuit board for controlling the motor, wherein
the amplification circuit is connected to a plurality of first lead lines,
the first lead lines are connected to a first connector,
the control circuit board is connected to a plurality of second lead lines, the second lead lines are connected to a second connector, and the first connector is connected to the second connector.

13. The screwing machine according to claim 1, wherein:

the transmission element includes:
- a sun gear that rotates by rotational force generated by the motor,
- one or more planetary gears that mesh with the sun gear and revolve around a center axis of the sun gear,
- a carrier that supports the one or more planetary gears such that the one or more planetary gears are rotatable relative to the carrier and rotates owing to the revolving of the one or more planetary gears, and
- an internal gear that meshes with the one or more planetary gears, the output shaft is connected to the carrier so as to be rotated by the motor via the carrier, and the twist portion is configured to be twisted by receiving, via the internal gear, the torque applied to the output shaft.

14. A torque sensor comprising:

a twist portion that is hollow and configured to be twisted from a front side about a central axis by shaft torque;

a plate portion (i) disposed rearward of the twist portion, (ii) integrally formed with the twist portion and (iii) including a front surface that is perpendicular to the central axis;

a strain gauge disposed on the twist portion; and an amplification circuit that is disposed on the front surface of the plate portion and has a largest face that faces the front surface and to which a signal from the strain gauge is input.

* * * * *